United States Patent
Kwon et al.

(10) Patent No.: US 11,414,601 B2
(45) Date of Patent: Aug. 16, 2022

(54) LIQUID CRYSTAL ALIGNMENT AGENT COMPOSITION, METHOD OF PRODUCING LIQUID CRYSTAL ALIGNMENT FILM USING THE SAME, AND LIQUID CRYSTAL ALIGNMENT FILM USING THE SAME

(71) Applicant: LG CHEM, LTD., Seoul (KR)

(72) Inventors: Soon Ho Kwon, Daejeon (KR); Seongku Kim, Daejeon (KR); Sung Joon Min, Daejeon (KR); Hoonseo Park, Daejeon (KR); Hyeong Seuk Yun, Daejeon (KR); Sang Mi Lee, Daejeon (KR); Jung Ho Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 183 days.

(21) Appl. No.: 16/619,688

(22) PCT Filed: Oct. 10, 2018

(86) PCT No.: PCT/KR2018/011897
§ 371 (c)(1),
(2) Date: Dec. 5, 2019

(87) PCT Pub. No.: WO2019/078535
PCT Pub. Date: Apr. 25, 2019

(65) Prior Publication Data
US 2020/0165522 A1    May 28, 2020

(30) Foreign Application Priority Data
Oct. 20, 2017  (KR) .................. 10-2017-0136516

(51) Int. Cl.
*G02F 1/1337*    (2006.01)
*C09K 19/56*    (2006.01)
*C08G 73/10*    (2006.01)

(52) U.S. Cl.
CPC .......... *C09K 19/56* (2013.01); *C08G 73/1078* (2013.01); *G02F 1/133723* (2013.01); *G02F 1/133788* (2013.01); *C09K 2323/027* (2020.08)

(58) Field of Classification Search
CPC ......... G02F 1/133723; G02F 1/133719; G02F 1/133788; C09K 2323/025; C09K 2323/027; C09K 19/56; C08G 73/1042; C08G 73/1067; C08G 73/1085; C08G 73/105; C08G 73/1071; C08G 73/1007; C08G 73/1025; C08L 79/08; C08L 2205/025
See application file for complete search history.

(56) References Cited

U.S. PATENT DOCUMENTS

| | | | |
|---|---|---|---|
| 2014/0255710 A1 | 9/2014 | Oishi et al. | |
| 2015/0045481 A1 | 2/2015 | Kim et al. | |
| 2018/0230384 A1 | 8/2018 | Jo et al. | |
| 2018/0231845 A1 | 8/2018 | Kwon | |
| 2018/0298284 A1* | 10/2018 | Jo | ............... G02F 1/133711 |

FOREIGN PATENT DOCUMENTS

| | | | | |
|---|---|---|---|---|
| JP | H03-121132 A | | 5/1991 | |
| JP | 2012-150251 A | | 8/2012 | |
| JP | 2015-222387 A | | 12/2015 | |
| JP | 2015215591 A | * | 12/2015 | |
| JP | 6852248 B2 | * | 3/2021 | ............ C08G 73/10 |
| KR | 10-2011-0088394 A | | 8/2011 | |
| KR | 10-2012-0084253 A | | 7/2012 | |
| KR | 10-2013-0079141 A | | 7/2013 | |
| KR | 10-2013-0103023 A | | 9/2013 | |
| KR | 10-2014-0051405 A | | 4/2014 | |
| KR | 10-2016-0095801 A | | 8/2016 | |
| KR | 10-2017-0040087 A | | 4/2017 | |
| KR | 10-2017-0055418 A | | 5/2017 | |
| KR | 102195312 B1 | * | 12/2020 | |
| TW | 201231505 A | | 8/2012 | |
| WO | 2017-065226 A1 | | 4/2017 | |

OTHER PUBLICATIONS

Search Report & Written Opinion issued for PCT Application No. PCT/KR2018/011897 dated Mar. 22, 2019, 11 pages.

* cited by examiner

*Primary Examiner* — Sophie Hon
(74) *Attorney, Agent, or Firm* — Rothwell, Figg, Ernst & Manbeck, P.C.

(57) ABSTRACT

A liquid crystal alignment agent composition for producing a liquid crystal alignment film having enhanced alignment property and stability and a high voltage holding ratio, a method of producing a liquid crystal alignment film using the same, and a liquid crystal alignment film and a liquid crystal display device using the same, are provided.

13 Claims, No Drawings

LIQUID CRYSTAL ALIGNMENT AGENT COMPOSITION, METHOD OF PRODUCING LIQUID CRYSTAL ALIGNMENT FILM USING THE SAME, AND LIQUID CRYSTAL ALIGNMENT FILM USING THE SAME

CROSS-REFERENCE TO RELATED APPLICATION

This application is a 35 U.S.C. 371 National Phase Entry Application from PCT/KR2018/011897, filed Oct. 10, 2018, which claims the benefit of priority from Korean Patent Application No. 10-2017-0136516 filed on Oct. 20, 2017 with the Korean Intellectual Property Office, the disclosures of which are incorporated herein by reference in their entirety.

TECHNICAL FIELD

The present invention relates to a liquid crystal alignment agent composition for producing a liquid crystal alignment film having enhanced liquid crystal alignment property and stability and a high voltage holding ratio, a method of producing a liquid crystal alignment film using the same, and a liquid crystal alignment film and a liquid crystal display device using the same.

BACKGROUND ART

In a liquid crystal display device, a liquid crystal alignment film plays a role in aligning liquid crystals in a predetermined direction. Specifically, the liquid crystal alignment film serves as a director in the arrangement of liquid crystal molecules, and when the liquid crystals move by an electric field to form an image, the liquid crystal alignment film helps the liquid crystals take an appropriate direction. In order to obtain uniform brightness and a high contrast ratio in a liquid crystal display device, it is essential for the liquid crystals to be uniformly aligned.

As one of conventional methods of aligning liquid crystals, a rubbing method of applying a polymer film such as polyimide onto a substrate such as glass, etc. and rubbing the surface thereof in a predetermined direction with a fiber such as nylon or polyester has been used. However, in the rubbing method, when the fiber and the polymer film are rubbed, fine dust or electrical discharge (ESD) may occur, which may cause serious problems during production of a liquid crystal panel.

In order to solve the problems of the rubbing method, recent studies have been conducted on a photo-alignment method in which anisotropy is induced in the polymer film not through friction but through light irradiation to align liquid crystals.

A variety of materials have been suggested as materials that may be used in the photo-alignment method. Among them, a polyimide is mainly used for good performances of the liquid crystal alignment film. However, the polyimide is generally poor in solvent solubility, and therefore it is difficult to directly apply it in a process of forming an alignment film by coating with a solution state of the polyimide. For this reason, a precursor form such as a polyamic acid or a polyamic acid ester with excellent solubility is coated and subjected to a high heat treatment process to form the polyimide, which is then subjected to light irradiation for alignment.

However, a lot of energy is required to obtain sufficient liquid crystal alignment by light irradiation of the polyimide film. Accordingly, there are limitations that it is difficult to secure productivity in practice and an additional heat treatment process is needed to obtain alignment stability after light irradiation.

In addition, a high voltage holding ratio (VHR) is required for high-quality operation of a liquid crystal display device, but there is a limit to achieving the high voltage holding ratio by using the polyimide alone. Particularly, in recent years, as a demand for a lower power display has increased, the liquid crystal alignment agent was found to affect not only basic properties such as the alignment property of liquid crystals, but also electrical properties such as an afterimage generated by a direct current/alternating voltage and the voltage holding ratio. Thus, there is a growing need for the development of a liquid crystal alignment material capable of simultaneously realizing excellent liquid crystal alignment and electrical properties.

Accordingly, there is a need to develop a novel liquid crystal alignment agent having excellent liquid crystal alignment and electrical properties under high temperature environments to improve performance of a liquid crystal display device and to realize a lower power display.

DETAILED DESCRIPTION OF THE INVENTION

Technical Problem

The present invention provides a liquid crystal alignment agent composition having excellent alignment property and stability as well as having enhanced electrical properties such as a voltage holding ratio under high temperature environments.

Further, the present invention provides a method of producing a liquid crystal alignment film using the liquid crystal alignment agent composition.

Furthermore, the present invention provides a liquid crystal alignment film produced by the production method and a liquid crystal display device including the liquid crystal alignment film.

Technical Solution

The present invention provides a liquid crystal alignment agent composition including; a polymer for a first liquid crystal alignment agent including two or more repeating units selected from the group consisting of a repeating unit represented by the following Chemical Formula 1, a repeating unit represented by the following Chemical Formula 2, and a repeating unit represented by the following Chemical Formula 3, wherein the repeating unit represented by the following Chemical Formula 1 is included in an amount of 5 mol % to 74 mol % with respect to a total of the repeating units represented by the following Chemical Formulae 1 to 3; and a polymer for a second liquid crystal alignment agent including one or more repeating units selected from the group consisting of a repeating unit represented by the following Chemical Formula 4, a repeating unit represented by the following Chemical Formula 5, and a repeating unit represented by the following Chemical Formula 6:

[Chemical Formula 1]

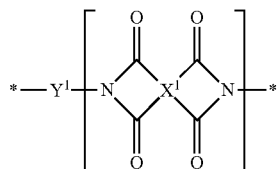

-continued

[Chemical Formula 2]
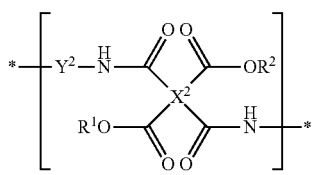

[Chemical Formula 3]
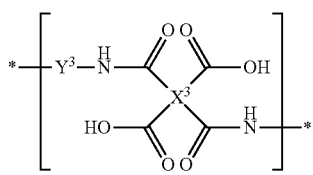

[Chemical Formula 4]
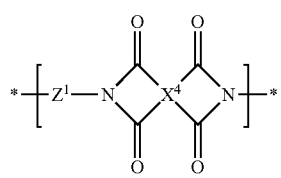

[Chemical Formula 5]
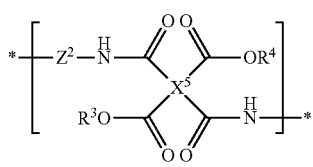

[Chemical Formula 6]
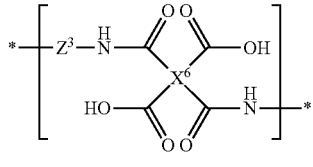

wherein, in Chemical Formulae 1 to 6, $R^1$, $R^2$, $R^3$, and $R^4$ are each independently hydrogen or a $C_{1\text{-}10}$ alkyl, provided that $R^1$ and $R^2$ are not both hydrogen, and that $R^3$ and $R^4$ are not both hydrogen, $X^1$ is a tetravalent organic group represented by the following Chemical Formula 7:

[Chemical Formula 7]
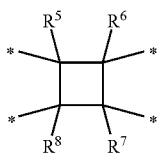

wherein, in Chemical Formula 7, $R^5$, $R^6$, $R^7$, and $R^8$ are each independently hydrogen or a $C_{1\text{-}6}$ alkyl, and $X^2$, $X^3$, $X^4$, $X^5$, and $X^6$ are each independently a tetravalent organic group derived from a hydrocarbon having 4 to 20 carbon atoms, or a tetravalent organic group derived from a hydrocarbon having 4 to 20 carbon atoms wherein one or more of H is substituted with a halogen or one or more of —$CH_2$— is substituted with —O—, —CO—, —S—, —SO—, —$SO_2$—, or —CONH— to prevent direct binding with oxygen or sulfur atoms in the tetravalent organic group, and in Chemical Formulae 1 to 3, $Y^1$ to $Y^3$ are each independently a divalent organic group represented by the following Chemical Formula 8:

[Chemical Formula 8]
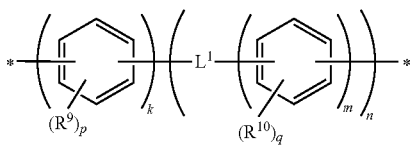

wherein, in Chemical Formula 8, $R^9$ and $R^{10}$ are each independently a halogen, a cyano, a $C_{1\text{-}10}$ alkyl, a $C_{2\text{-}10}$ alkenyl, a $C_{1\text{-}10}$ alkoxy, a $C_{1\text{-}10}$ fluoroalkyl, or a $C_{1\text{-}10}$ fluoroalkoxy, p and q are each independently an integer of 0 to 4, $L^1$ is a single bond, —O—, —CO—, —S—, —$SO_2$—, —$C(CH_3)_2$—, —$C(CF_3)_2$—, —CONH—, —COO—, —$(CH_2)_z$—, —$O(CH_2)_zO$—, —$O(CH_2)_z$—, —$OCH_2$—$C(CH_3)_2$—$CH_2O$—, —COO—$(CH_2)_z$—OCO—, or —OCO—$(CH_2)_z$—COO—, wherein z is an integer of 1 to 10, k and m are each independently an integer of 1 to 3, and n is an integer of 0 to 3, and in Chemical Formulae 4 to 6, $Z^1$, $Z^2$, and $Z^3$ are each independently a divalent organic group represented by the following Chemical Formula 9:

[Chemical Formula 9]
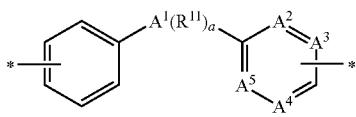

wherein, in Chemical Formula 9, $A^1$ is an element of Group 15, $R^{11}$ is hydrogen or a $C_{1\text{-}10}$ alkyl, a is an integer of 1 to 3, and $A^2$, $A^3$, $A^4$, and $A^5$ are nitrogen or carbon, provided that at least one of $A^2$ to $A^5$ is nitrogen and the others are carbon.

Hereinafter, a liquid crystal alignment agent composition according to a specific embodiment of the present invention, a method of producing a liquid crystal alignment film using the same, and a liquid crystal display device including the liquid crystal alignment film thus produced will be described in more detail.

Throughout the specification, when one part "includes" one constituent element, unless otherwise specifically described, this does not mean that another constituent element is excluded, but means that another constituent element may be further included.

As used herein, the term "substituted" means that a hydrogen atom in a compound is changed to another substituent, and a position to be substituted is not limited as long as the position is a position at which the hydrogen atom is substituted, that is, a position at which the substituent may be substituted, and when two or more are substituted, the two or more substituents may be the same as or different from each other.

As used herein, the term "substituted or unsubstituted" means that substitution is performed by one or more substituent groups selected from the group consisting of deuterium; a halogen group; a cyano group; a nitro group; a hydroxyl group; a carbonyl group; an ester group; an imide group; an amide group; an amino group; a carboxyl group; a sulfonic acid group; a sulfonamide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an arylphosphine group; or a heterocyclic group containing at least one of N, O, and S atoms, or there is no substituent group, or substitution is performed by a substituent group where two or more substituent groups of the exemplified substituent groups are linked, or there is no substituent group. For example, the term "substituent group where two or more substituent groups are linked" may refer to a biphenyl group. That is, the biphenyl group may be an aryl group, or may be interpreted as a substituent group where two phenyl groups are connected.

In the present specification,

or ——— ⁂ means a bond connected to another substituent group, and a direct bond means a case where another atom does not exist in a portion represented by $L^1$ to $L^6$.

In the present specification, the alkyl group may be straight-chained or branched, and the number of carbon atoms thereof is not particularly limited, but is preferably 1 to 10. According to another embodiment, the alkyl group has 1 to 6 carbon atoms. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cycloheptylmethyl, octyl, n-octyl, tert-octyl, 1-methylheptyl, 2-ethylhexyl, 2-propylpentyl, n-nonyl, 2,2-dimethylheptyl, 1-ethylpropyl, 1,1-dimethyl-propyl, isohexyl, 2-methylpentyl, 4-methylhexyl, 5-methylhexyl, and the like, but are not limited thereto.

The fluoroalkyl group having 1 to 10 carbon atoms may be one in which at least one hydrogen atom in an alkyl group having 1 to 10 carbon atoms is substituted with fluorine, and the fluoroalkoxy group having 1 to 10 carbon atoms may be one in which at least one hydrogen atom in an alkoxy group having 1 to 10 carbon atoms is substituted with fluorine.

The halogen group may be fluorine (F), chlorine (Cl), bromine (Br), or iodine (I).

The element of Group 15 may be nitrogen (N), phosphorus (P), arsenic (As), antimony (Sb), or bismuth (Bi).

The nitrogen oxide is a compound in which a nitrogen atom and an oxygen atom are bonded, and the nitrogen oxide functional group means a functional group containing a nitrogen oxide in the functional group. Examples of the nitrogen oxide functional group include a nitro group ($-NO_2$) and the like.

The liquid crystal alignment agent composition according to the present invention is characterized by including both of a polymer for a first liquid crystal alignment agent which is a partially imidized polyimide precursor and a polymer for a second liquid crystal alignment agent which is a polyimide precursor derived from diamine of an asymmetric pyridine structure.

When the polyimide is conventionally used as a liquid crystal alignment film, a polyimide precursor, a polyamic acid, or a polyamic acid ester having excellent solubility is coated and dried to form a coating film, and then converted to polyimide through a high-temperature heat treatment process, which is then subjected to light irradiation for alignment treatment. However, a lot of light irradiation energy is required to obtain sufficient liquid crystal alignment by light irradiation of the polyimide film, and an additional heat treatment process is also required to secure alignment stability after light irradiation. The use of a lot of light irradiation energy and the additional high-temperature heat treatment process are very disadvantageous in terms of process cost and time, and thus there are restrictions in application of the method to a practical mass-production process.

Accordingly, the present inventors found that when the polymer for the first liquid crystal alignment agent including two or more repeating units of Chemical Formulae 1 to 3 prepared from a reaction product containing an imide group-containing diamine compound having a specific structure is used, imide repeating units that have been already imidized are included in a predetermined amount, and thus anisotropy is directly generated by light irradiation without the high-temperature heat treatment process after formation of the coating film, and subsequently, heat treatment is performed to complete an alignment film. Accordingly, light irradiation energy may be greatly reduced, and a liquid crystal alignment film having an enhanced alignment property and stability may be produced even by a simple process including a single heat treatment process.

Further, the present inventors found that when the polymer for the second liquid crystal alignment agent including one or more repeating units of Chemical Formulae 4 to 6 prepared from a reaction product containing a nitrogen-atom containing diamine compound having a specific structure, in addition to the polymer for the first liquid crystal alignment agent, are included in a liquid crystal alignment agent composition, a liquid crystal alignment film produced therefrom may have a high voltage holding ratio even at a high temperature, a reduction in contrast ratio or an afterimage phenomenon may be improved, and alignment stability due to heat stress and mechanical strength of the alignment film may be improved.

According to one embodiment of the present invention, a liquid crystal alignment agent composition including the polymer for the first liquid crystal alignment agent including two or more repeating units selected from the group consisting of the repeating unit represented by Chemical Formula 1, the repeating unit represented by Chemical Formula 2, and the repeating unit represented by Chemical Formula 3, wherein the repeating unit represented by Chemical Formula 1 is included in an amount of 5 mol % to 74 mol %, with respect to a total of the repeating units represented by Chemical Formulae 1 to 3; and the polymer for the second liquid crystal alignment agent including one or more repeating units selected from the group consisting of the repeating unit represented by Chemical Formula 4, the repeating unit represented by Chemical Formula 5, and the repeating unit represented by Chemical Formula 6, is provided.

Specifically, with regard to the polymer for the first liquid crystal alignment agent and the polymer for the second liquid crystal alignment agent in the liquid crystal alignment agent composition according to one embodiment, in the repeating units of Chemical Formulae 1 to 6, $X^1$ is a tetravalent organic group represented by Chemical Formula 7, and $X^2$, $X^3$, $X^4$, $X^5$, and $X^6$ are each independently a tetravalent organic group derived from a hydrocarbon having 4 to 20 carbon atoms, or a tetravalent organic group derived from a hydrocarbon having 4 to 20 carbon atoms wherein one or more of H is substituted with a halogen or one or more of —$CH_2$— is substituted with —O—, —CO—, —S—, —SO—, —$SO_2$—, or —CONH— to prevent direct binding with oxygen or sulfur atoms in the tetravalent organic group.

For example, $X^2$, $X^3$, $X^4$, $X^5$, and $X^6$ may each independently be a tetravalent organic group represented by the following Chemical Formula 10:

[Chemical Formula 10]

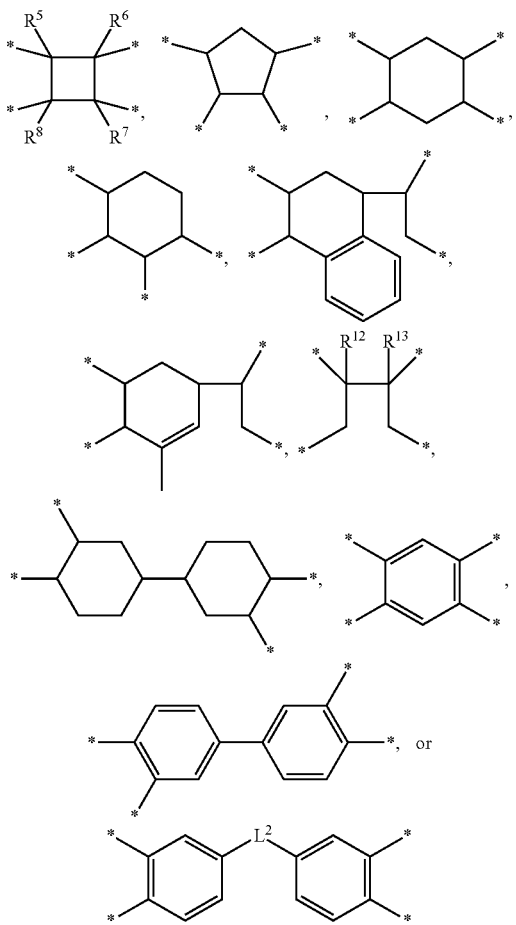

wherein, in Chemical Formula 10, $R^5$, $R^6$, $R^7$, and $R^8$ are each independently hydrogen or a $C_{1-6}$ alkyl, $R^{12}$ and $R^{13}$ are each independently hydrogen or a $C_{1-10}$ alkyl, $L^2$ is any one selected from the group consisting of a single bond, —O—, —CO—, —S—, —SO—, —$SO_2$—, —$CR^{14}R^{15}$—, —CONH—, —COO—, —$(CH_2)_b$—, —$O(CH_2)_bO$—, —COO—$(CH_2)_b$—OCO—, —HN— $(CH_2)_b$—NH—, —$R^{14}N$—$(CH_2)_b$—$NR^{15}$—, phenylene, and combinations thereof, wherein $R^{14}$ and $R^{15}$ are each independently hydrogen, a $C_{1-10}$ alkyl, or a $C_{1-10}$ fluoroalkyl, and each b is independently an integer of 1 to 10.

Further, the polymer for the first liquid crystal alignment agent in the liquid crystal alignment agent composition according to one embodiment may include the repeating units of Chemical Formulae 1 to 3 wherein $Y^1$, $Y^2$, and $Y^3$ may each independently be a divalent organic group represented by Chemical Formula 8.

In Chemical Formula 8, hydrogen is bound to carbon which is not substituted with $R^9$ or $R^{10}$, and when p or q is an integer of 2 to 4, a plurality of $R^9$ or $R^{10}$ may be the same or different substituents. Further, in Chemical Formula 8, k and m may each independently be an integer of 0 to 3, or 1 to 3, and n may be an integer of 0 to 3, or 0 or 1.

Chemical Formula 8 corresponds to a part of the repeating unit derived from the imide-containing diamine having a specific structure which is a precursor used in the formation of the polymer for the liquid crystal alignment agent.

More specifically, Chemical Formula 8 may be the following Chemical Formula 11 or Chemical Formula 12:

[Chemical Formula 11]

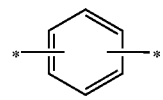

[Chemical Formula 12]

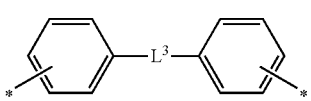

wherein, in Chemical Formula 12, $L^3$ is a single bond, —O—, —$SO_2$—, or —$CR^{16}R^{17}$—, wherein $R^{16}$ and $R^{17}$ are each independently hydrogen or a $C_{1-10}$ alkyl.

Preferably, Chemical Formula 11 may be the following Chemical Formula 11-1:

[Chemical Formula 11-1]

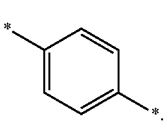

Further, the Chemical Formula 12 may be the following Chemical Formula 12-1:

[Chemical Formula 12-1]

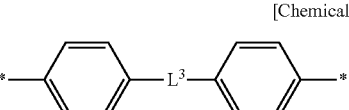

wherein, in Chemical Formula 12-1, $L^3$ is O or $CH_2$.

Further, the polymer for the second liquid crystal alignment agent in the liquid crystal alignment agent composition according to one embodiment may have repeating units of Chemical Formulae 4 to 6, wherein $Z^1$, $Z^2$, and $Z^3$ may each independently be a divalent organic group represented by Chemical Formula 9. The $Z^1$, $Z^2$, and $Z^3$ may be defined as the divalent organic group represented by Chemical Formula 4 to provide a polymer for a liquid crystal alignment agent having various structures, which may exhibit the above-descried effects.

In Chemical Formula 9, $A^1$ may be an element of Group 15, and the element of Groups 15 may be nitrogen (N), phosphorus (P), arsenic (As), antimony (Sb), or bismuth (Bi). The $R^{11}$ is a functional group binding to $A^1$, and may bind to the $A^1$ element by a number represented by a. Preferably, in Chemical Formula 9, $A^1$ may be nitrogen, $R^{11}$ may be hydrogen, and a may be 1.

On the other hand, by satisfying the condition that in Chemical Formula 9, at least one of $A^2$ to $A^5$ is nitrogen and the others are carbon, Chemical Formula 9 may form an asymmetric structure which does not form symmetry with respect to the center point or the center line due to the nitrogen atom. Chemical Formula 9 is a repeating unit derived from a nitrogen atom-containing diamine having a specific structure, which is a precursor used for the formation of the polymer for the liquid crystal alignment agent, and this is considered to be due to the use of an asymmetric diamine as described later.

The functional group represented by Chemical Formula 9 has a structural feature in which two aromatic cyclic compounds, preferably, a heteroaromatic cyclic compound and an aromatic cyclic compound, are bound through a secondary amine group or a tertiary amine group. Therefore, the liquid crystal alignment agent may satisfy an equivalent level or more of alignment property or afterimage property and may have an improved voltage holding ratio, thereby realizing excellent electrical properties.

On the other hand, when two aromatic cyclic compounds are bound by a single bond without a secondary amine group or a tertiary amine group, there are technical problems in that the alignment property of the liquid crystal alignment agent becomes poor, and the voltage holding ratio is relatively reduced.

Further, in the case where neither of the two aromatic cyclic compounds bound through a secondary amine group or a tertiary amine group contain a nitrogen atom, even if the imidization reaction of the polyamic acid or the polyamic acid ester formed by the reaction of amine and acid anhydride proceeds (e.g., via 230° C. heat treatment), a sufficient imidization reaction does not proceed, and thus there is a limitation in that an imidization rate decreases within the final liquid crystal alignment film.

Further, the functional group represented by Chemical Formula 11 is characterized in that only the amine group and hydrogen are bound to each of two aromatic cyclic compounds, preferably, the heteroaromatic cyclic compound and the aromatic cyclic compound, and other substituents are not introduced. When a substituent such as a fluoroalkyl group is introduced into the heteroaromatic cyclic compound or the aromatic cyclic compound, there is a technical problem in that the alignment property deteriorates due to the substituent.

More specifically, in Chemical Formula 9, one of $A^2$ to $A^5$ may be nitrogen and the others may be carbon. In Chemical Formula 9, one of $A^2$ and $A^5$ is nitrogen and the other is carbon, and $A^3$ and $A^4$ may be carbon. That is, in Chemical Formula 9, the aromatic ring containing $A^2$ to $A^5$ may have a pyridine structure. Accordingly, the liquid crystal display device to which the polymer for the liquid crystal alignment agent of one embodiment is applied may realize a high voltage holding ratio and liquid crystal alignment property.

Further, Chemical Formula 9 may include one or more repeating units selected from the group consisting of the following Chemical Formula 9-1, Chemical Formula 9-2, and Chemical Formula 9-3:

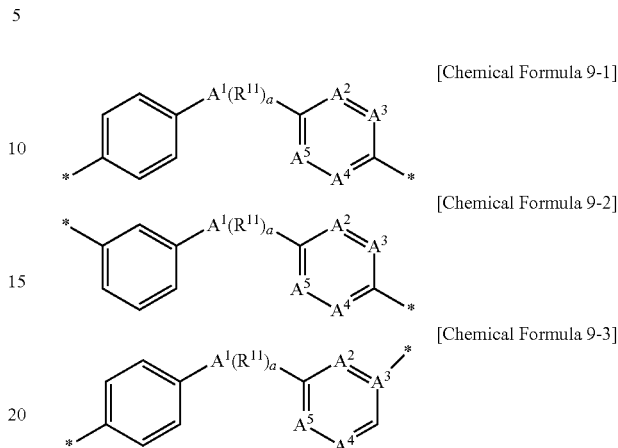

[Chemical Formula 9-1]

[Chemical Formula 9-2]

[Chemical Formula 9-3]

wherein, in Chemical Formula 9-1, Chemical Formula 9-2, and Chemical Formula 9-3, descriptions of $A^1$, $A^2$, $A^3$, $A^4$, $A^5$, $R^{11}$ and a include the above description of Chemical Formula 9.

As described above, since the repeating unit of Chemical Formula 9 includes one or more repeating units selected from the group consisting of Chemical Formula 9-1, Chemical Formula 9-2, and Chemical Formula 9-3, a much better liquid crystal alignment property may be realized.

The polymer for the first liquid crystal alignment agent in the liquid crystal alignment agent composition according to one embodiment may include the repeating unit represented by Chemical Formula 1 which is an imide repeating unit, among the repeating units represented by Chemical Formula 1, Chemical Formula 2, and Chemical Formula 3, in an amount of 5 mol % to 74 mol %, and preferably 10 mol % to 60 mol %, with respect to a total of the repeating units.

As described above, when the polymer including the specific amount of the imide repeating unit represented by Chemical Formula 1 is used, the polymer for the first liquid crystal alignment agent includes a predetermined amount of already imidized imide repeating units, and thus a liquid crystal alignment film having excellent alignment property and stability may be produced even when the high-temperature heat treatment process is omitted and light is directly irradiated.

If the repeating unit represented by Chemical Formula 1 is included at less than the above-mentioned content range, sufficient alignment properties may not be exhibited and alignment stability may be deteriorated. If the content of the repeating unit represented by Chemical Formula 1 exceeds the above-mentioned content range, there is a problem in that the solubility is lowered and thus it is difficult to prepare a stable alignment solution capable of coating. Accordingly, it is preferable to include the repeating unit represented by Chemical Formula 1 within the above-mentioned content range, in terms of providing a polymer for a liquid crystal alignment agent having excellent storage stability, electrical properties, alignment properties, and alignment stability.

Further, the repeating unit represented by Chemical Formula 2 or the repeating unit represented by Chemical Formula 3 may be included in an appropriate amount depending on the desired properties.

Specifically, the repeating unit represented by Chemical Formula 2 may be included in an amount of 0 mol % to 40 mol %, preferably 0 mol % to 30 mol %, with respect to a total of the repeating units represented by Chemical Formulas 1 to 3. The repeating unit represented by Chemical Formula 2 has a low rate of conversion to imide during a high-temperature heat treatment process after light irradiation, and therefore, if the amount exceeds the above range, the overall imidization rate is insufficient, thereby deteriorating the alignment stability. Accordingly, the repeating unit represented by Chemical Formula 2 exhibits appropriate solubility within the above-mentioned range, thereby providing a polymer for a liquid crystal alignment agent which may implement a high imidization rate while having excellent processing properties.

Furthermore, the repeating unit represented by Chemical Formula 3 may be included in an amount of 0 mol % to 95 mol %, and preferably 10 mol % to 90 mol %, with respect to a total of the repeating units represented by Chemical Formulae 1 to 3. Within such a range, excellent coating properties may be exhibited, thereby providing a polymer for a liquid crystal alignment agent which may implement a high imidization rate while having excellent processing properties.

Meanwhile, the polymer for the second liquid crystal alignment agent in the liquid crystal alignment agent composition according to one embodiment may include the repeating unit represented by Chemical Formula 4 which is an imide repeating unit, among the repeating units represented by Chemical Formula 4, Chemical Formula 5, and Chemical Formula 6, in an amount of 0 mol % to 80 mol %, and preferably 0.1 mol % to 65 mol %, with respect to a total of the repeating units.

As described above, when the polymer including the specific amount of the imide repeating unit represented by Chemical Formula 4 is used, the polymer includes a predetermined amount of already imidized imide repeating units, and thus a liquid crystal alignment film having excellent alignment property and stability may be produced even when the high-temperature heat treatment process is omitted and light is directly irradiated.

If the repeating unit represented by Chemical Formula 4 is included at less than the above-mentioned content range, sufficient alignment properties may not be exhibited and alignment stability may be deteriorated. If the content of the repeating unit represented by Chemical Formula 4 exceeds the above-mentioned content range, there is a problem in that the solubility is lowered and thus it is difficult to prepare a stable alignment solution capable of coating. Accordingly, it is preferable to include the repeating unit represented by Chemical Formula 4 within the above-mentioned content range, in terms of providing a polymer for a liquid crystal alignment agent having excellent storage stability, electrical properties, alignment properties, and alignment stability.

Further, the repeating unit represented by Chemical Formula 5 or the repeating unit represented by Chemical Formula 6 may be included in an appropriate amount depending on the desired properties.

Specifically, the repeating unit represented by Chemical Formula 5 may be included in an amount of 0 mol % to 50 mol %, preferably 0.1 mol % to 30 mol %, with respect to a total of the repeating units represented by Chemical Formulae 4 to 6. The repeating unit represented by Chemical Formula 5 has a low rate of conversion to imide during a high-temperature heat treatment process after light irradiation, and therefore, if the amount exceeds the above range, the overall imidization rate is insufficient, thereby deteriorating the alignment stability. Accordingly, the repeating unit represented by Chemical Formula 5 exhibits appropriate solubility within the above-mentioned range, thereby providing a polymer for a liquid crystal alignment agent which may implement a high imidization rate while having excellent processing properties.

Furthermore, the repeating unit represented by Chemical Formula 6 may be included in an amount of 10 mol % to 100 mol %, and preferably 30 mol % to 99.8 mol %, with respect to a total of the repeating units represented by Chemical Formulae 4 to 6. Within such a range, excellent coating properties may be exhibited, thereby providing a polymer for a liquid crystal alignment agent which may implement a high imidization rate while having excellent processing properties.

Meanwhile, the liquid crystal alignment agent composition according to one embodiment may include the polymer for the first liquid crystal alignment agent and the polymer for the second liquid crystal alignment agent at a weight ratio of about 5:95 to about 95:5, and preferably about 15:85 to about 85:15.

As described above, the polymer for the first liquid crystal alignment agent may include a predetermined amount of already imidized imide repeating units, and thus anisotropy is directly generated by light irradiation without the high-temperature heat treatment process after formation of the coating film, and subsequently, heat treatment is performed to complete an alignment film. In addition, the polymer for the second liquid crystal alignment agent may include the repeating unit derived from a nitrogen atom-containing diamine compound having a specific asymmetric structure, and thus a high voltage holding ratio may be obtained even at a high temperature, and a reduction in a contrast ratio or an afterimage phenomenon may be improved, thereby improving electrical properties. When the polymer for the first liquid crystal alignment agent and the polymer for the second liquid crystal alignment agent, each having the above-described characteristics, are used after being mixed with each other in the above weight ratio, excellent photoreactive property and liquid crystal alignment property of the polymer for the first liquid crystal alignment agent and the excellent electrical properties of the polymer for the second liquid crystal alignment agent may complement each other, and therefore, excellent coating properties may be exhibited, thereby producing a liquid crystal alignment film which may implement a high imidization rate while having excellent processing properties, and may have excellent electrical properties such as an afterimage generated by the direct current/alternating voltage and the voltage holding ratio, and a liquid crystal alignment film which may have a much better alignment property and electrical properties at the same time.

Meanwhile, the polymer for the second liquid crystal alignment agent in the liquid crystal alignment agent composition according to one embodiment may further include one or more repeating units selected from the group consisting of a repeating unit represented by the following Chemical Formula 13, a repeating unit represented by the following Chemical Formula 14, and a repeating unit represented by the following Chemical Formula 15:

[Chemical Formula 13]

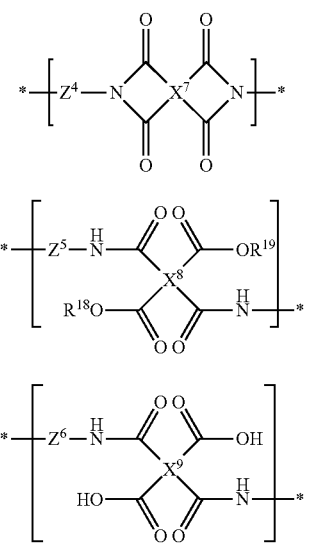

[Chemical Formula 14]

[Chemical Formula 15]

wherein, in Chemical Formulae 13 to 15, at least one of $R^{18}$ and $R^{19}$ is an alkyl group having 1 to 10 carbon atoms and the other is hydrogen, $X^7$ to $X^9$ are each independently a tetravalent organic group, and $Z^4$ to $Z^6$ are each independently a divalent organic group represented by the following Chemical Formula 16:

[Chemical Formula 16]

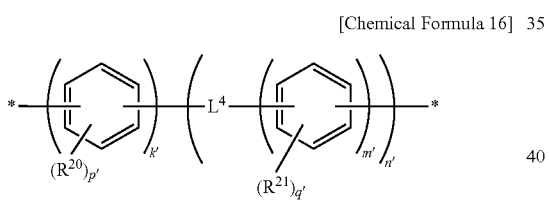

wherein, in Chemical Formula 16, $R^{20}$ and $R^{21}$ are each independently a halogen, a cyano, a $C_{1-10}$ alkyl, a $C_{2-10}$ alkenyl, a $C_{1-10}$ alkoxy, a $C_{1-10}$ fluoroalkyl, or a $C_{1-10}$ fluoroalkoxy, p' and q' are each independently an integer of 0 to 4, $L^4$ is a single bond, —O—, —CO—, —S—, —$SO_2$—, —$C(CH_3)_2$—, —$C(CF_3)_2$—, —CONH—, —COO—, —$(CH_2)_z$—, —$O(CH_2)_zO$—, —$O(CH_2)_z$—, —$OCH_2$—C$(CH_3)_2$—$CH_2O$—, —COO—$(CH_2)_z$—OCO—, or —OCO—$(CH_2)_z$—COO—, wherein each z is independently an integer of 1 to 10, k' and m' are each independently an integer of 0 to 3, and n' is an integer of 0 to 3.

In Chemical Formula 16, hydrogen may be bound to carbon which is not substituted with $R^{20}$ or $R^{21}$, and p' and q' are each independently an integer of 0 to 4, 1 to 4, or 2 to 4, and when p' or q' is an integer of 2 to 4, a plurality of $R^{20}$ or $R^{21}$ may be the same or different substituents.

Further, in Chemical Formula 16, k' and m' may each independently be an integer of 0 to 3, or 1 to 3, and n' may be an integer of 0 to 3, or 1 to 3.

More specifically, Chemical Formula 16 may be the following Chemical Formula 17 or Chemical Formula 18:

[Chemical Formula 17]

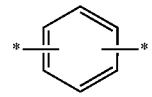

[Chemical Formula 18]

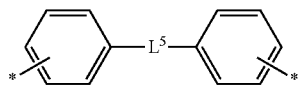

wherein, in Chemical Formula 18, $L^5$ is a single bond, —O—, —$SO_2$—, or —$CR^{22}R^{23}$—, wherein $R^{22}$ and $R^{23}$ are each independently hydrogen or a $C_{1-10}$ alkyl.

Preferably, the Chemical Formula 17 may be the following Chemical Formula 17-1:

[Chemical Formula 17-1]

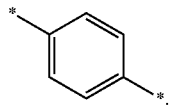

Further, the Chemical Formula 18 may be the following Chemical Formula 18-1:

[Chemical Formula 18-1]

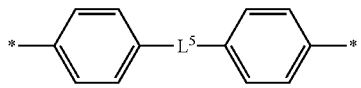

wherein, in Chemical Formula 18-1, $L^5$ is O or $CH_2$.

In Chemical Formulae 13 to 15, $X^7$ to $X^9$ are each independently a tetravalent organic group derived from a hydrocarbon having 4 to 20 carbon atoms, or a tetravalent organic group derived from a hydrocarbon having 4 to 20 carbon atoms wherein one or more of H is substituted with a halogen or one or more of —$CH_2$— is substituted with —O—, —CO—, —S—, —SO—, —$SO_2$—, or —CONH— to prevent direct binding with oxygen or sulfur atoms in the tetravalent organic group.

For example, $X^7$ to $X^9$ may each independently include a tetravalent organic group described in the following Chemical Formula 19:

[Chemical Formula 19]

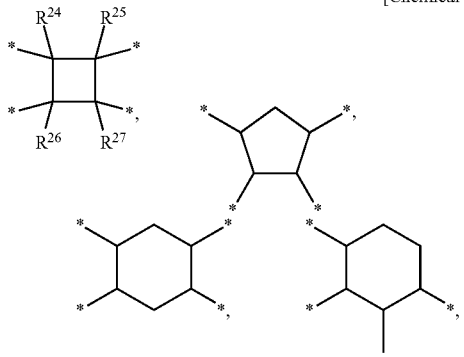

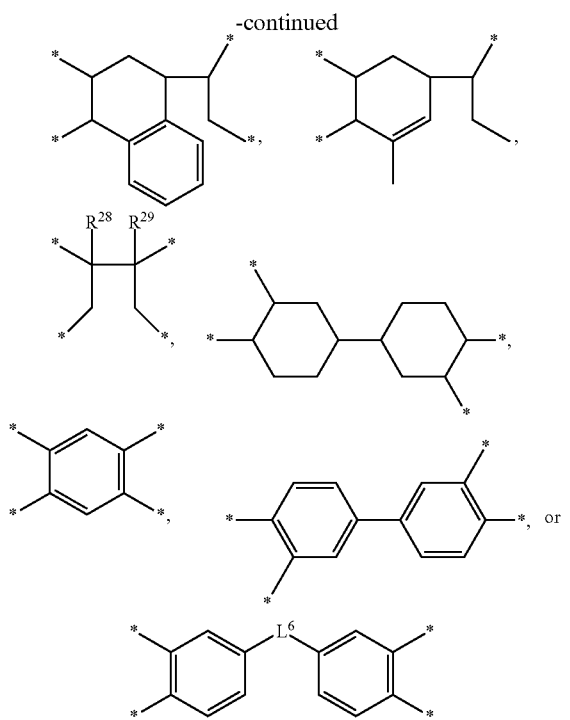

wherein, in Chemical Formula 19,
$R^{24}$, $R^{25}$, $R^{26}$, and $R^{27}$ are each independently hydrogen or a $C_{1-6}$ alkyl,
$R^{28}$ and $R^{29}$ are each independently hydrogen or a $C_{1-10}$ alkyl, and
$L^6$ is any one selected from the group consisting of a single bond, —O—, —CO—, —S—, —SO—, —SO$_2$—, —CR$^{30}$R$^{31}$—, —COO—, —(CH$_2$)$_b$—, —O(CH$_2$)$_b$O—, —COO—(CH$_2$)$_b$—OCO—, —HN—(CH$_2$)$_b$—NH—, —R$^{30}$N—(CH$_2$)$_b$—NR$^{31}$—, phenylene, and combinations thereof, wherein $R^{30}$ and $R^{31}$ are each independently hydrogen, a $C_{1-10}$ alkyl, or a $C_{1-10}$ fluoroalkyl, and each b is independently an integer of 1 to 10.

In this regard, a molar ratio between one or more repeating units selected from the group consisting of the repeating unit represented by Chemical Formula 4, the repeating unit represented by Chemical Formula 5, and the repeating unit represented by Chemical Formula 6, and one or more repeating units selected from the group consisting of the repeating unit represented by Chemical Formula 13, the repeating unit represented by Chemical Formula 14, and the repeating unit represented by Chemical Formula 15, may be 1:100 to 100:1.

Further, the polymer for the first liquid crystal alignment agent and the polymer for the second liquid crystal alignment agent may have a weight average molecular weight of 1000 g/mol to 200,000 g/mol. The weight average molecular weight means a weight average molecular weight in terms of polystyrene measured by a GPC method. In the process of determining the weight average molecular weight in terms of polystyrene measured by the GPC method, a commonly known analyzing device, a detector such as a refractive index detector or a UV-detector, and an analytical column may be used. Commonly applied conditions for temperature, solvent, and flow rate may be used. Specific examples of the measurement conditions may include a temperature of 40° C., a mixed solvent of dimethylformamide (DMF)/tetrahydrofuran (THF), and a flow rate of 0.5 mL/min to 1.0 mL/min.

On the other hand, according to still another embodiment of the present invention, a method of producing a liquid crystal alignment film using the liquid crystal alignment agent composition as described above is provided. The method of producing a liquid crystal alignment film may include the steps of: coating the liquid crystal alignment agent composition onto a substrate to form a coating film (step 1); drying the coating film (step 2); irradiating the coating film with light immediately after the drying step to perform an alignment treatment (step 3); and heat-treating and curing the alignment-treated coating film (step 4).

The step 1 is a step of coating the above-described liquid crystal alignment agent composition onto a substrate to form a coating film.

The method of coating the liquid crystal alignment agent composition onto a substrate is not particularly limited, and for example, a method such as screen printing, offset printing, flexographic printing, inkjet printing, etc. may be used.

Furthermore, the liquid crystal alignment agent composition may be those which are dissolved or dispersed in an organic solvent. Specific examples of the organic solvent include N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethyl sulfoxide, tetramethylurea, pyridine, dimethyl sulfone, hexamethyl sulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, ethylene glycol monomethyl ether, ethylene glycol monomethyl ether acetate, ethylene glycol monoethyl ether, ethylene glycol monoethyl ether acetate, ethylene glycol monopropyl ether, ethylene glycol monopropyl ether acetate, ethylene glycol monoisopropyl ether, ethylene glycol monoisopropyl ether acetate, ethylene glycol monobutyl ether, ethylene glycol monobutyl ether acetate, and the like. These solvents may be used alone or in a mixture thereof.

In addition, the liquid crystal alignment agent composition may further include other components in addition to the organic solvent. For a non-limiting example, when the liquid crystal alignment agent composition has been coated, an additive capable of improving uniformity of film thickness or surface smoothness, improving adhesion between the liquid crystal alignment film and the substrate, changing the dielectric constant and conductivity of a liquid crystal alignment film, or increasing the density of the liquid crystal alignment film, may further be included. Such an additive may be exemplified by a variety of solvents, surfactants, silane-based compounds, dielectric substances, crosslinkable compounds, etc.

The step 2 is a step of drying the coating film which is formed by coating the liquid crystal alignment agent composition onto a substrate.

In the step of drying the coating film, a method such as heating of a coating film or vacuum evaporation may be used, and the drying may be preferably carried out at 50° C. to 150° C., or at 60° C. to 140° C.

The step 3 is a step of irradiating the coating film with light immediately after the drying step to perform alignment treatment.

In the present disclosure, the "irradiating the coating film immediately after the drying step" means that light is directly irradiated, after the drying step, without carrying out a heat treatment at a temperature equal to or higher than that of the drying step, and steps other than the heat treatment may be added.

More specifically, when a liquid crystal alignment film is produced using a conventional liquid crystal alignment agent including a polyamic acid or a polyamic acid ester, a step of irradiating light after essentially performing a high-temperature heat treatment for imidization of the polyamic acid is included. However, when a liquid crystal alignment film is produced using the liquid crystal alignment agent of one embodiment described above, the heat treatment step is not included, and light is directly irradiated to perform alignment treatment, and then the alignment-treated coating film is cured by a heat treatment, thereby producing a liquid crystal alignment film having sufficient alignment property and enhanced stability with a low light irradiation energy.

In the alignment treatment step, the light irradiation is performed by irradiating polarized ultraviolet rays having a wavelength of 150 nm to 450 nm. In this case, the intensity of the light exposure may vary depending on the kind of the polymer for the liquid crystal alignment agent. Preferably, energy of 10 mJ/cm$^2$ to 10 J/cm$^2$, and more preferably, energy of 30 mJ/cm$^2$ to 2 J/cm$^2$, may be irradiated.

As for the ultraviolet rays, polarized ultraviolet rays selected among ultraviolet rays subjected to polarization treatment by a method of passing through or reflecting with ① a polarizing device using a substrate in which a dielectric anisotropic material is coated on the surface of a transparent substrate such as quartz glass, soda lime glass, soda lime-free glass, etc., ② a polarizer plate on which aluminum or metal wires are finely deposited, or ③ a Brewster's polarizing device operating by the reflection of quartz glass, etc., are irradiated to perform the alignment treatment. In this regard, the polarized ultraviolet rays may be irradiated perpendicularly to the surface of the substrate, or may be irradiated by directing at an angle of incidence toward a specific angle. By this method, the alignment ability of the liquid crystal molecules is imparted to the coating film.

The step 4 is a step of heat-treating and curing the alignment-treated coating film.

The step of heat-treating and curing the alignment-treated coating film is a step that is carried out after light irradiation even in the conventional method of producing a liquid crystal alignment film using a polymer for a liquid crystal alignment agent including a polyamic acid or a polyamic acid ester, and is distinguished from the heat treatment step which is performed to imidize the liquid crystal alignment agent before irradiating light or while irradiating light, after coating the liquid crystal alignment agent onto a substrate.

In this regard, the heat treatment may be carried out by a heating means such as a hot plate, a hot air circulation path, an infrared ray furnace, and the like, and the heat treatment is preferably carried out at a temperature of 150° C. to 300° C., or 200° C. to 250° C.

On the other hand, after the step of drying the coating film (step 2), a step of heat-treating the coating film immediately after the drying step at a temperature equal to or higher than that of the drying step may be further included, if necessary. The heat treatment may be performed by a heating means such as a hot plate, a hot air circulation path, an infrared furnace, or the like, and is preferably performed at 150° C. to 250° C. In this process, the liquid crystal alignment agent may be imidized.

That is, the method of producing a liquid crystal alignment film may include the steps of: coating the above-mentioned liquid crystal alignment agent onto a substrate to form a coating film (step 1); drying the coating film (step 2); heat-treating the coating film immediately after the drying step at a temperature equal to or higher than that of the drying step (step 3); irradiating the heat-treated coating film with light or rubbing the coating film to perform alignment treatment (step 4); and heat-treating and curing the alignment-treated coating film (step 5).

On the other hand, according to still another embodiment of the present invention, a liquid crystal alignment film produced by the above-described method of producing the liquid crystal alignment film is provided.

As described above, when the polymer for the first liquid crystal alignment agent including two or more repeating units selected from the group consisting of the repeating unit represented by Chemical Formula 1, the repeating unit represented by Chemical Formula 2, and the repeating unit represented by Chemical Formula 3, wherein the imide repeating unit represented by Chemical Formula 1, among the repeating units, is included in an amount of 5 mol % to 74 mol %, and the polymer for the second liquid crystal alignment agent including one or more repeating units selected from the group consisting of the repeating unit represented by Chemical Formula 4, the repeating unit represented by Chemical Formula 5, and the repeating unit represented by Chemical Formula 6 are mixed and used, it is possible to produce a liquid crystal alignment film having enhanced alignment property and stability.

On the other hand, according to still another embodiment of the present invention, a liquid crystal display device including the liquid crystal alignment film described above is provided.

The liquid crystal alignment film may be introduced into a liquid crystal cell by a known method, and likewise, the liquid crystal cell may be introduced into a liquid crystal display device by a known method. The liquid crystal alignment film may be produced from the polymer including the particular amount of the repeating unit represented by Chemical Formula 1, and thus may implement excellent stability together with excellent physical properties. Accordingly, it is possible to provide a liquid crystal display device having high reliability.

Advantageous Effects

According to the present invention, a method of producing a liquid crystal alignment film having excellent alignment property and stability, a high voltage holding ratio at a high temperature, and excellent electrical properties by improving deterioration of a contrast ratio or an afterimage phenomenon through a simple process with a lowered light irradiation energy, the method capable of providing the liquid crystal alignment film by applying a liquid crystal alignment agent composition onto a substrate, drying the coating film, immediately irradiating the coating film with light to perform an alignment treatment while omitting a high-temperature heat treatment process, and then heat-treating and curing the alignment-treated coating film; a liquid crystal alignment film produced thereby; and a liquid crystal display device including the liquid crystal alignment film, are provided.

DETAILED DESCRIPTION OF THE EMBODIMENTS

The present invention will be described in more detail in the following examples. However, the following examples are for illustrative purposes only, and the scope of the present invention is not intended to be limited thereby.

PREPARATION EXAMPLE

Preparation Example 1: Preparation of Diamine DA1-1

Preparation was performed as in the following reaction scheme.

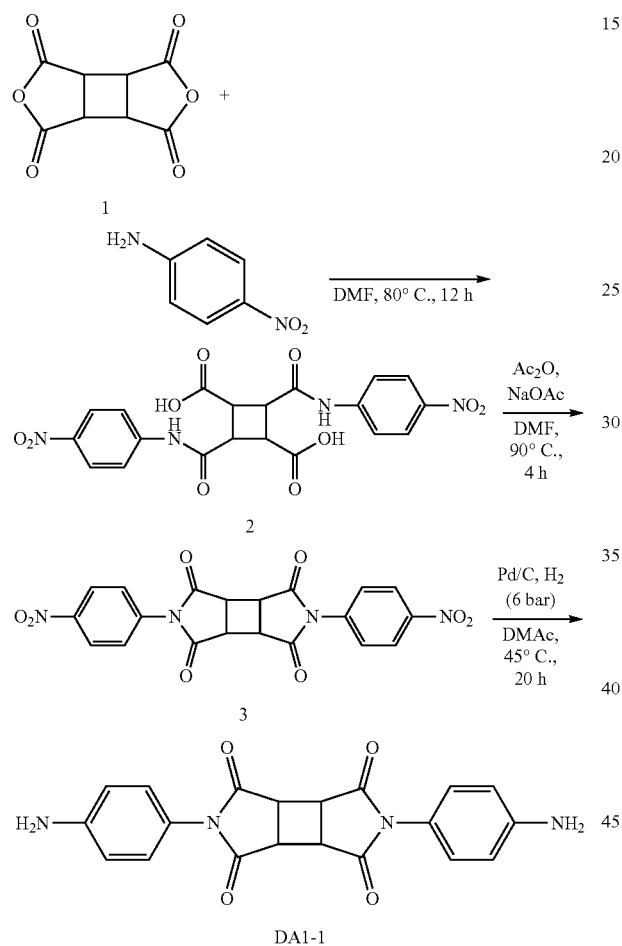

Specifically, CBDA (cyclobutane-1,2,3,4-tetracarboxylic dianhydride, compound 1) and 4-nitroaniline were dissolved in DMF (dimethylformamide) to prepare a mixture. Subsequently, this mixture was allowed to react at about 80° C. for about 12 hours to prepare an amic acid of a compound 2. Thereafter, the amic acid was dissolved in DMF, and acetic anhydride and sodium acetate were added thereto to prepare a mixture. Subsequently, the amic acid in the mixture was subjected to imidization at about 90° C. for about 4 hours to prepare a compound 3. An imide of the compound 3 thus prepared was dissolved in DMAc (dimethylacetamide), and then Pd/C was added thereto to prepare a mixture. This mixture was reduced at about 45° C. under hydrogen pressure of about 6 bar for about 20 hours to prepare a diamine DA1-1.

Preparation Example 2: Preparation of Diamine DA1-2

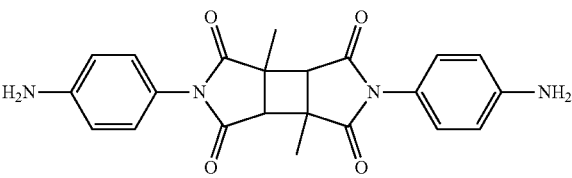

DA1-2 was prepared in the same manner as in Preparation Example 1, except that DMCBDA (1,3-dimethylcyclobutane-1,2,3,4-tetracarboxylic dianhydride) was used instead of CBDA (cyclobutane-1,2,3,4-tetracarboxylic dianhydride).

Preparation Example 3: Synthesis of Diamine DA1-3

Preparation was performed as in the following reaction scheme.

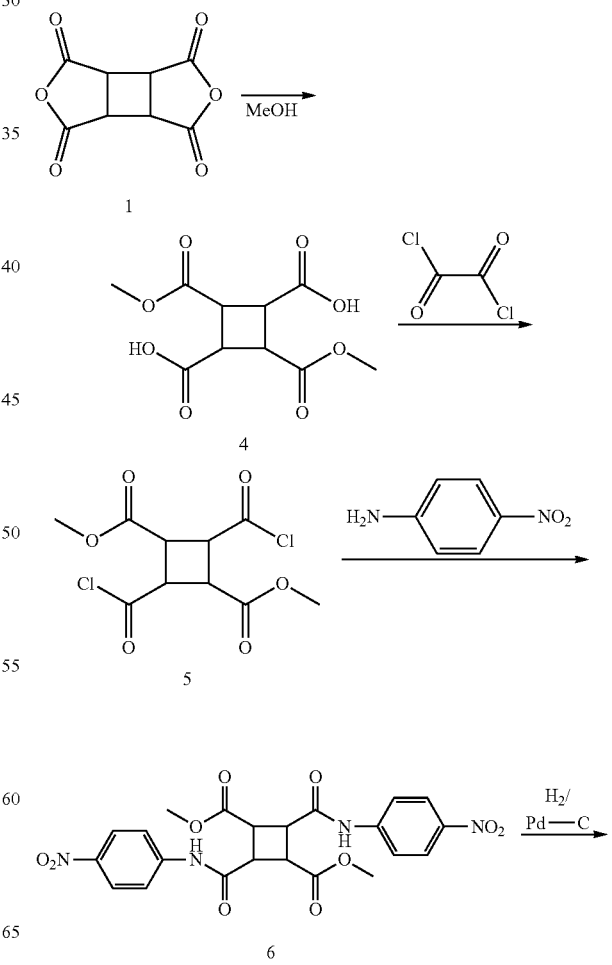

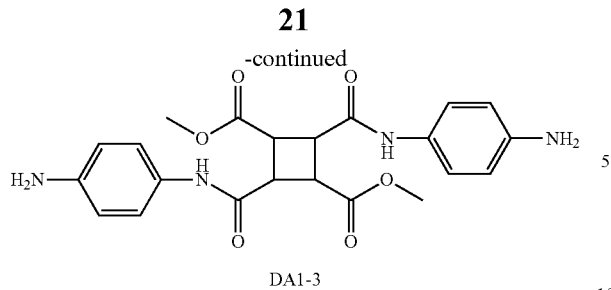

DA1-3

Specifically, 25 g of CBDA (cyclobutane-1,2,3,4-tetracarboxylic dianhydride, compound 1) was added to 250 mL of methanol, and 1 to 2 drops of hydrochloric acid was added thereto, and heated under reflux at about 75° C. for about 5 hours. The solvent was removed under reduced pressure, and 300 mL of ethyl acetate and n-hexane were added for solidification. A produced solid was filtered under reduced pressure and dried under reduced pressure at about 40° C. to obtain 32 g of a compound 4.

100 mL of toluene was added to 34 g of the obtained compound 4, and 35 g of oxalyl chloride was added dropwise at room temperature. 2 to 3 drops of dimethylformamide (DMF) was added dropwise and stirred at about 50° C. for about 16 hours. After cooling to room temperature, the solvent and remaining oxalyl chloride were removed under reduced pressure. 300 mL of n-hexane was added to a yellow solid product and heated under reflux at about 80° C. The heated reaction solution was filtered to remove impurities which were not dissolved in n-hexane, and slowly cooled to room temperature. A produced white crystal was filtered and then dried in a vacuum oven at about 40° C. to obtain 32.6 g of a compound 5.

29.6 g of 4-nitroaniline and 21.7 g of triethanolamine (TEA) were added to about 400 mL of tetrahydrofuran (THF), and 32.6 g of compound 5 was added thereto at room temperature. After stirring at room temperature for about 16 hours, a produced precipitate was filtered. About 400 ml of dichloromethane was added to a filtrate, followed by washing with a 0.1 N hydrochloric acid aqueous solution and then washing with a saturated sodium hydrogen carbonate (NaHCO$_3$) aqueous solution. The washed organic solution was filtered under reduced pressure to obtain a solid product. The product was recrystallized from dichloromethane to obtain 43 g of a solid-phase dinitro compound 6.

43 g of the dinitro compound 6 thus obtained was put in a high-pressure reactor and dissolved in about 500 mL of THF. 2.2 g of 10 wt % Pd/C was added thereto, followed by stirring under hydrogen gas (H$_2$) at 3 atm for about 16 hours at room temperature. After reaction, Pd—C was removed using a Celite filter. After filtration, a filtrate was concentrated under reduced pressure to obtain 37 g of esterified diamine DA1-3.

Preparation Example 4: Synthesis of Diamine DA2-1

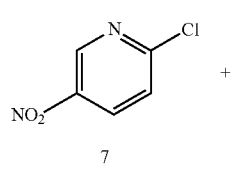

7

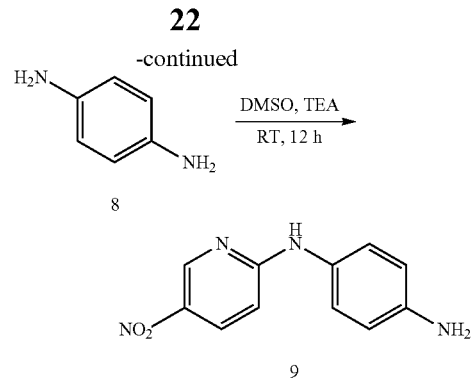

18.3 g (100 mmol) of 2-chloro-5-nitropyridine (compound 7) and 12.5 g (98.6 mmol) of para-phenylenediamine (p-PDA, compound 8) were completely dissolved in about 200 mL of dimethyl sulfoxide (DMSO), and then 23.4 g (200 mmol) of trimethylamine (TEA) was added thereto, and stirred at room temperature for about 12 hours. When the reaction was completed, the reaction product was put in a container containing about 500 mL of water, followed by stirring for about 1 hour. A solid obtained by filtration was washed with about 200 mL of water and about 200 mL of ethanol to obtain 16 g (61.3 mmol) of a compound 9 (yield: 60%).

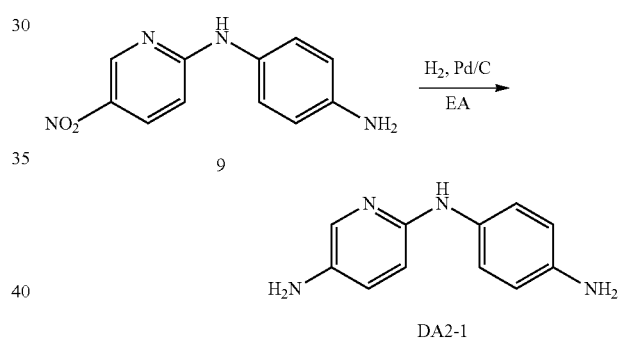

DA2-1

The compound 9 was dissolved in about 200 mL of a 1:1 mixture of ethyl acetate (EA) and THF, and then 0.8 g of palladium/carbon (Pd/C) was added, followed by stirring under a hydrogen atmosphere for about 12 hours. After completion of the reaction, a filtrate filtered through a Celite pad was concentrated to obtain 11 g of a diamine compound DA2-1 (pIDA) (yield: 89%).

Preparation Example 5: Synthesis of Diamine DA2-2

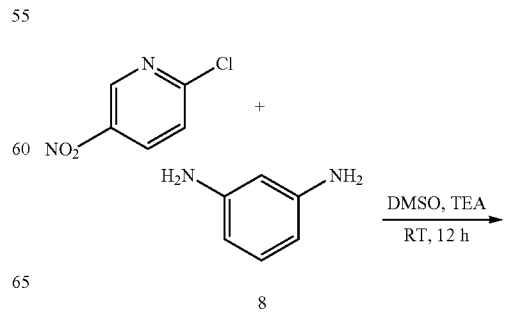

8

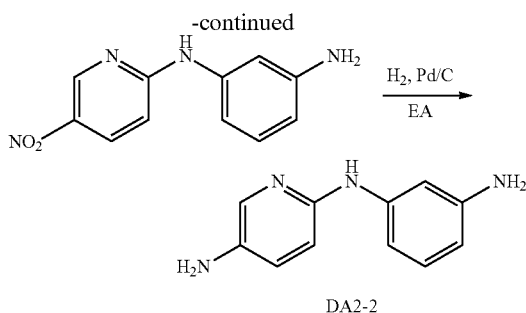

DA2-2

A diamine compound DA2-2 was prepared in the same manner as in Preparation Example 4, except that meta-phenylenediamine (m-PDA) was used instead of para-phenylenediamine (p-PDA, compound 8).

Preparation Example 6: Synthesis of Diamine DA2-3

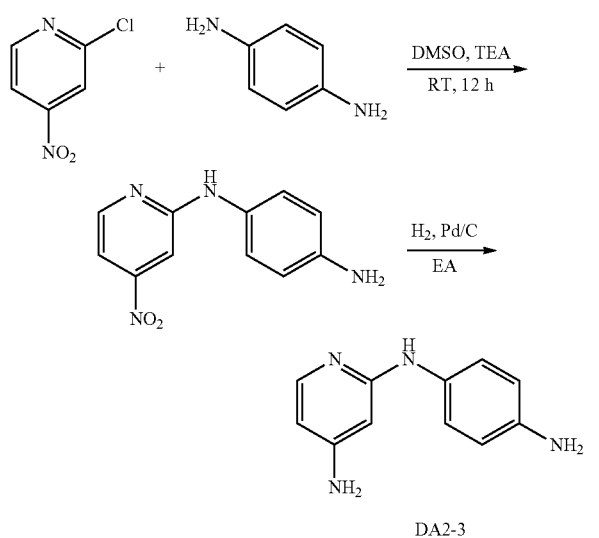

DA2-3

A diamine compound DA2-3 was prepared in the same manner as in Preparation Example 4, except that 2-chloro-4-nitropyridine was used instead of 2-chloro-5-nitropyridine (compound 7).

Synthesis Example

Synthesis Examples 1 to 4 and Comparative Synthesis Example 1: Synthesis of First Polymer Synthesis Example 1: Preparation of Polymer P-1 for Liquid Crystal Alignment Agent 5.0 g (13.3 mmol) of DA1-1 prepared in Preparation Example 1 was completely dissolved in 71.27 g of anhydrous N-methyl pyrrolidone (NMP). In an ice bath, 2.92 g (13.03 mmol) of 1,3-dimethyl-cyclobutane-1,2,3,4-tetracarboxylic dianhydride (DMCBDA) was added to the solution, and stirred at room temperature for about 16 hours to prepare a polymer P-1 for a liquid crystal alignment agent.

A molecular weight of the polymer P-1 was confirmed by GPC, and as a result, its number average molecular weight (Mn) was 15,500 g/mol and its weight average molecular weight (Mw) was 31,000 g/mol. A monomer structure of the polymer P-1 is determined by an equivalent ratio of the used monomer, and in the molecule, a ratio of the imide structure was 50.5%, and a ratio of the amic acid structure was 49.5%.

Synthesis Example 2: Preparation of Polymer P-2 for Liquid Crystal Alignment Agent 5.376 g of DA1-2 prepared in Preparation Example 2 was first dissolved in 74.66 g of NMP, and 2.92 g of 1,3-dimethyl-cyclobutane-1,2,3,4-tetracarboxylic dianhydride (DMCBDA) was added thereto, and stirred at room temperature for about 16 hours. Thereafter, a polymer P-2 was prepared in the same manner as in Synthesis Example 1.

A molecular weight of the polymer P-2 was confirmed by GPC, and as a result, its number average molecular weight (Mn) was 17,300 g/mol and its weight average molecular weight (Mw) was 34,000 g/mol. In the molecule of the polymer P-2, a ratio of the imide structure was 50.5%, and a ratio of the amic acid structure was 49.5%.

Synthesis Example 3: Preparation of Polymer P-3 for Liquid Crystal Alignment Agent 5.0 g of DA1-2 prepared in Preparation Example 2 and 1.07 g of p-phenylenediamine were first dissolved in 89.81 g of NMP, and 1.90 g of cyclobutane-1,2,3,4-tetracarboxylic dianhydride (CBDA) and 3.00 g of oxydiphthalic dianhydride were added thereto, and stirred at room temperature for about 16 hours to prepare a polymer P-3.

A molecular weight of the polymer P-3 was confirmed by GPC, and as a result, its number average molecular weight (Mn) was 17,000 g/mol and its weight average molecular weight (Mw) was 33,000 g/mol. In the molecule of the polymer P-3, a ratio of the imide structure was 33.8%, and a ratio of the amic acid structure was 66.2%.

Synthesis Example 4: Preparation of Polymer P-4 for Liquid Crystal Alignment Agent 5.0 g of DA1-1 prepared in Preparation Example 2 and 3.93 g of DA1-3 prepared in Preparation Example 3 were first dissolved in 127.94 g of NMP, and then 5.28 g of cyclobutane-1,2,3,4-tetracarboxylic dianhydride (CBDA) was added thereto, and stirred for about 16 hours at room temperature to prepare a polymer P-4 for a liquid crystal alignment agent.

Comparative Synthesis Example 1: Preparation of Polymer PR-1 for Liquid Crystal Alignment Agent 6.00 g of p-phenylenediamine was first dissolved in 156.9 g of NMP, and 5.34 g of cyclobutane-1,2,3,4-tetracarboxylic dianhydride (CBDA) and 6.10 g of 1,3-dimethyl-cyclobutane-1,2,3,4-tetracarboxylic dianhydride (DMCBDA) were added thereto, and stirred for about 16 hours at room temperature to prepare a polymer PR-1.

A molecular weight of the polymer PR-1 was confirmed by GPC, and as a result, its number average molecular weight (Mn) was 15,000 g/mol and its weight average molecular weight (Mw) was 28,000 g/mol. The monomer structure of the polymer PR-1 was analyzed, and as a result, a ratio of the amic acid structure in the molecule was 100%.

Synthesis Examples 5 to 25 and Comparative Synthesis Examples 2 to 7: Synthesis of Second Polymer

Synthesis Example 5: Polymer Q-1 for Liquid Crystal Alignment Agent 19.743 g (0.099 mmol) of diamine DA2-1 prepared in Preparation Example 4 was completely dissolved in 225.213 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-1 for a liquid crystal alignment agent. A molecular weight of the polymer Q-1 was confirmed by GPC, and as a result, its weight average molecular weight (Mw) was 27,000 g/mol.

Synthesis Example 6: Polymer Q-2 for Liquid Crystal Alignment Agent 14.637 g (0.073 mmol) of diamine DA2-1 prepared in Preparation Example 4 was completely dissolved in 225.213 g of anhydrous N-methyl pyrrolidone (NMP).

In an ice bath, 20.0 g (0.068 mmol) of 3,3',4,4'-biphenyl tetracarboxylic acid dianhydride (BPDA) was added to the solution, and stirred at room temperature for about 16 hours to prepare a polymer Q-2 for a liquid crystal alignment agent. A molecular weight of the polymer Q-2 was confirmed by GPC, and as a result, its weight average molecular weight (Mw) was 24,000 g/mol.

Synthesis Example 7: Polymer Q-3 for Liquid Crystal Alignment Agent 19.211 g (0.096 mmol) of diamine DA2-1 prepared in Preparation Example 4 was completely dissolved in 222.194 g of anhydrous N-methyl pyrrolidone (NMP).

In an ice bath, 20.0 g (0.089 mmol) of 1,2,4,5-cyclohexanetetracarboxylic dianhydride (HPMDA) was added to the solution, and stirred at room temperature for about 16 hours to prepare a polymer Q-3 for a liquid crystal alignment agent. A molecular weight of the polymer Q-3 was confirmed by GPC, and as a result, its weight average molecular weight (Mw) was 26,500 g/mol.

Synthesis Example 8: Polymer Q-4 for Liquid Crystal Alignment Agent 1.974 g (0.01 mmol) of diamine DA2-1 prepared in Preparation Example 4 and 9.596 g (0.089 mmol) of p-phenylenediamine (p-PDA) were completely dissolved in 178.897 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-4 for a liquid crystal alignment agent. A molecular weight of the polymer Q-4 was confirmed by GPC, and as a result, its weight average molecular weight (Mw) was 24,500 g/mol.

Synthesis Example 9: Polymer Q-5 for Liquid Crystal Alignment Agent 9.872 g (0.049 mmol) of diamine DA2-1 prepared in Preparation Example 4 and 5.331 g (0.049 mmol) of p-phenylenediamine (p-PDA) were completely dissolved in 199.482 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-5 for a liquid crystal alignment agent. A molecular weight of the polymer Q-5 was confirmed by GPC, and as a result, its weight average molecular weight (Mw) was 27,500 g/mol.

Synthesis Example 10: Polymer Q-6 for Liquid Crystal Alignment Agent 1.974 g (0.01 mmol) of diamine DA2-1 prepared in Preparation Example 4 and 17.768 g (0.089 mmol) of 4,4'-oxydianiline (ODA) were completely dissolved in 225.208 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-6 for a liquid crystal alignment agent. A molecular weight of the polymer Q-6 was confirmed by GPC, and as a result, its weight average molecular weight (Mw) was 28,500 g/mol.

Synthesis Example 11: Polymer Q-7 for Liquid Crystal Alignment Agent 9.872 g (0.049 mmol) of diamine DA2-1 prepared in Preparation Example 4 and 9.871 g (0.049 mmol) of 4,4'-oxydianiline (ODA) were completely dissolved in 225.21 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-7 for a liquid crystal alignment agent. A molecular weight of the polymer Q-7 was confirmed by GPC, and as a result, its weight average molecular weight (Mw) was 27,000 g/mol.

Synthesis Example 12: Polymer Q-8 for Liquid Crystal Alignment Agent 1.974 g (0.01 mmol) of diamine DA2-1 prepared in Preparation Example 4 and 17.593 g (0.089 mmol) of 4,4'-methylenedianiline (MDA) were completely dissolved in 224.218 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-8 for a liquid crystal alignment agent. A molecular weight of the polymer Q-8 was confirmed by GPC, and as a result, its weight average molecular weight (Mw) was 29,500 g/mol.

Synthesis Example 13: Polymer Q-9 for Liquid Crystal Alignment Agent 9.872 g (0.049 mmol) of diamine DA2-1 prepared in Preparation Example 4 and 9.774 g (0.049 mmol) of 4,4'-methylenedianiline (MDA) were completely dissolved in 224.66 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-9 for a liquid crystal alignment agent. A molecular weight of the polymer Q-9 was confirmed by GPC, and as a result, its weight average molecular weight (Mw) was 28,000 g/mol.

Synthesis Example 14: Polymer Q-10 for Liquid Crystal Alignment Agent 1.464 g (0.007 mmol) of diamine DA2-1 prepared in Preparation Example 4 and 7.114 g (0.066 mmol) of p-phenylenediamine (p-PDA) were completely dissolved in 161.939 g of anhydrous N-methyl pyrrolidone (NMP).

In an ice bath, 20.0 g (0.068 mmol) of 3,3',4,4'-biphenyl tetracarboxylic acid dianhydride (BPDA) was added to the solution, and stirred at room temperature for about 16 hours to prepare a polymer Q-10 for a liquid crystal alignment agent. A molecular weight of the polymer Q-10 was confirmed by GPC, and as a result, its weight average molecular weight (Mw) was 27,500 g/mol.

Synthesis Example 15: Polymer Q-11 for Liquid Crystal Alignment Agent 1.464 g (0.007 mmol) of diamine DA2-1 prepared in Preparation Example 4 and 13.172 g (0.066 mmol) of 4,4'-oxydianiline (ODA) were completely dissolved in 196.272 g of anhydrous N-methyl pyrrolidone (NMP).

In an ice bath, 20.0 g (0.068 mmol) of 3,3',4,4'-biphenyl tetracarboxylic acid dianhydride (BPDA) was added to the solution, and stirred at room temperature for about 16 hours to prepare a polymer Q-11 for a liquid crystal alignment agent. A molecular weight of the polymer Q-11 was confirmed by GPC, and as a result, its weight average molecular weight (Mw) was 25,500 g/mol.

Synthesis Example 16: Polymer Q-12 for Liquid Crystal Alignment Agent 1.464 g (0.007 mmol) of diamine DA2-1 prepared in Preparation Example 4 and 13.043 g (0.066 mmol) of 4,4'-methylenedianiline (MDA) were completely dissolved in 195.537 g of anhydrous N-methyl pyrrolidone (NMP).

In an ice bath, 20.0 g (0.068 mmol) of 3,3',4,4'-biphenyl tetracarboxylic acid dianhydride (BPDA) was added to the solution, and stirred at room temperature for about 16 hours to prepare a polymer Q-12 for a liquid crystal alignment agent. A molecular weight of the polymer Q-12 was confirmed by GPC, and as a result, its weight average molecular weight (Mw) was 27,000 g/mol.

Synthesis Example 17: Polymer Q-13 for Liquid Crystal Alignment Agent 1.921 g (0.01 mmol) of diamine DA2-1 prepared in Preparation Example 4 and 9.337 g (0.086 mmol) of p-phenylenediamine (p-PDA) were completely dissolved in 177.128 g of anhydrous N-methyl pyrrolidone (NMP).

In an ice bath, 20.0 g (0.089 mmol) of 1,2,4,5-cyclohexanetetracarboxylic dianhydride (HPMDA) was added to the solution, and stirred at room temperature for about 16 hours to prepare a polymer Q-13 for a liquid crystal alignment agent. A molecular weight of the polymer Q-13 was confirmed by GPC, and as a result, its weight average molecular weight (Mw) was 23,500 g/mol.

Synthesis Example 18: Polymer Q-14 for Liquid Crystal Alignment Agent 1.921 g (0.01 mmol) of diamine DA2-1 prepared in Preparation Example 4 and 17.289 g (0.086 mmol) of 4,4'-oxydianiline (ODA) were completely dissolved in 222.189 g of anhydrous N-methyl pyrrolidone (NMP).

In an ice bath, 20.0 g (0.089 mmol) of 1,2,4,5-cyclohexanetetracarboxylic dianhydride (HPMDA) was added to the solution, and stirred at room temperature for about 16 hours to prepare a polymer Q-14 for a liquid crystal alignment agent. A molecular weight of the polymer Q-14 was confirmed by GPC, and as a result, its weight average molecular weight (Mw) was 26,500 g/mol.

Synthesis Example 19: Polymer Q-15 for Liquid Crystal Alignment Agent 1.921 g (0.01 mmol) of diamine DA2-1 prepared in Preparation Example 4 and 17.119 g (0.086 mmol) of 4,4'-methylenedianiline (MDA) were completely dissolved in 177.128 g of anhydrous N-methyl pyrrolidone (NMP).

In an ice bath, 20.0 g (0.089 mmol) of 1,2,4,5-cyclohexanetetracarboxylic dianhydride (HPMDA) was added to the solution, and stirred at room temperature for about 16 hours to prepare a polymer Q-15 for a liquid crystal alignment agent. A molecular weight of the polymer Q-15 was confirmed by GPC, and as a result, its weight average molecular weight (Mw) was 25,000 g/mol.

Synthesis Example 20: Polymer Q-16 for Liquid Crystal Alignment Agent 1.974 g (0.01 mmol) of diamine DA2-2 prepared in Preparation Example 5 and 9.596 g (0.089 mmol) of p-phenylenediamine (p-PDA) were completely dissolved in 178.897 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-16 for a liquid crystal alignment agent. A molecular weight of the polymer Q-16 was confirmed by GPC, and as a result, its weight average molecular weight (Mw) was 22,500 g/mol.

Synthesis Example 21: Polymer Q-17 for Liquid Crystal Alignment Agent 1.974 g (0.01 mmol) of diamine DA2-2 prepared in Preparation Example 5 and 17.768 g (0.089 mmol) of 4,4'-oxydianiline (ODA) were completely dissolved in 225.208 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-17 for a liquid crystal alignment agent. A molecular weight of the polymer Q-17 was confirmed by GPC, and as a result, its weight average molecular weight (Mw) was 24,500 g/mol.

Synthesis Example 22: Polymer Q-18 for Liquid Crystal Alignment Agent 1.974 g (0.01 mmol) of diamine DA2-2 prepared in Preparation Example 5 and 17.593 g (0.089 mmol) of 4,4'-methylenedianiline (MDA) were completely dissolved in 224.218 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-18 for a liquid crystal alignment agent. A molecular weight of the polymer Q-18 was confirmed by GPC, and as a result, its weight average molecular weight (Mw) was 23,000 g/mol.

Synthesis Example 23: Polymer Q-19 for Liquid Crystal Alignment Agent 1.974 g (0.01 mmol) of diamine DA2-3 prepared in Preparation Example 6 and 9.596 g (0.089 mmol) of p-phenylenediamine (p-PDA) were completely dissolved in 178.897 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-19 for a liquid crystal alignment agent. A molecular weight of the polymer Q-19 was confirmed by GPC, and as a result, its weight average molecular weight (Mw) was 21,500 g/mol.

Synthesis Example 24: Polymer Q-20 for Liquid Crystal Alignment Agent 1.974 g (0.01 mmol) of diamine DA2-3 prepared in Preparation Example 6 and 17.768 g (0.089 mmol) of 4,4'-oxydianiline (ODA) were completely dissolved in 225.208 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-20 for a liquid crystal alignment agent. A molecular weight of the polymer Q-20 was confirmed by GPC, and as a result, its weight average molecular weight (Mw) was 24,500 g/mol.

Synthesis Example 25: Polymer Q-21 for Liquid Crystal Alignment Agent 1.974 g (0.01 mmol) of diamine DA2-3 prepared in Preparation Example 6 and 17.593 g (0.089 mmol) of 4,4'-methylenedianiline (MDA) were completely dissolved in 224.218 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer Q-21 for a liquid crystal alignment agent. A molecular weight of the polymer Q-21 was confirmed by GPC, and as a result, its weight average molecular weight (Mw) was 21,000 g/mol.

Comparative Synthesis Example 2: Polymer QR-1 for Liquid Crystal Alignment Agent 26.852 g (0.099 mmol) of p-phenylenediamine (p-PDA) was completely dissolved in 265.496 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer QR-1 for a liquid crystal alignment agent. A molecular weight of the polymer QR-1 was confirmed by GPC, and as a result, its weight average molecular weight (Mw) was 26,000 g/mol.

Comparative Synthesis Example 3: Polymer QR-2 for Liquid Crystal Alignment Agent 19.743 g (0.099 mmol) of 4,4'-oxydianiline (ODA) was completely dissolved in 225.208 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer QR-2 for a liquid crystal alignment agent. A molecular weight of the polymer QR-2 was confirmed by GPC, and as a result, its weight average molecular weight (Mw) was 21,000 g/mol.

Comparative Synthesis Example 4: Polymer QR-3 for Liquid Crystal Alignment Agent 19.548 g (0.089 mmol) of 4,4'-methylenedianiline (MDA) was completely dissolved in 224.218 g of anhydrous N-methyl pyrrolidone (NMP).

In an ice bath, 20.0 g (0.092 mmol) of pyromellitic dianhydride (PMDA) was added to the solution, and stirred at room temperature for about 16 hours to prepare a polymer QR-3 for a liquid crystal alignment agent. A molecular weight of the polymer QR-3 was confirmed by GPC, and as a result, its weight average molecular weight (Mw) was 23,000 g/mol.

Comparative Synthesis Example 5: Polymer S-1 for Liquid Crystal Alignment Agent A polymer S-1 for a liquid crystal alignment agent was prepared in the same manner as in Synthesis Example 5, except that 6-(4-aminophenyl)pyridin-3-amine represented by the following Chemical Formula A was used instead of diamine DA2-1 prepared in Preparation Example 4.

[Chemical Formula A]

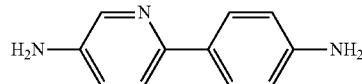

Comparative Synthesis Example 6: Polymer S-2 for Liquid Crystal Alignment Agent A polymer S-2 for a liquid crystal alignment agent was prepared in the same manner as in Synthesis Example 5, except that 4,4'-diaminodiphenylamine represented by the following Chemical Formula B was used instead of diamine DA2-1 prepared in Preparation Example 4.

[Chemical Formula B]

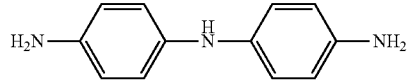

Comparative Synthesis Example 7: Polymer S-3 for Liquid Crystal Alignment Agent A polymer S-3 for a liquid crystal alignment agent was prepared in the same manner as in Synthesis Example 5, except that N-(2,6-bis(trifluoromethyl)-4-aminophenyl)-1,4-phenylenediamine represented by the following Chemical Formula C was used instead of diamine DA2-1 prepared in Preparation Example 4.

[Chemical Formula C]

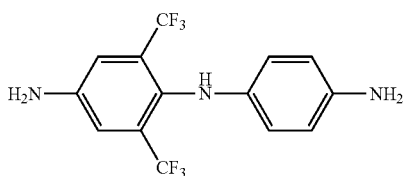

EXAMPLE

Example 1: Preparation of Liquid Crystal Alignment Agent Composition

According to the composition as shown in the following Table 1, 10 g of the polymer P-1 for a liquid crystal alignment agent prepared in Synthesis Example 1 and 10 g of the polymer Q-1 for a liquid crystal alignment agent prepared in Synthesis Example 5 were added to 12.4 g of NMP and 7.6 g of n-butoxyethanol (a weight ratio of 8:2) to prepare a 5 wt % solution. The obtained solution was filtered through a poly(tetrafluoroethylene) filter having a pore size of 0.1 µm under pressure to prepare a liquid crystal alignment agent composition.

Example 2: Preparation of Liquid Crystal Alignment Agent Composition

According to the composition as shown in the following Table 1, a liquid crystal alignment agent composition was prepared in the same manner as in Example 1, except that the polymer P-3 for a liquid crystal alignment agent was used instead of the polymer P-1 for a liquid crystal alignment agent.

Example 3: Preparation of Liquid Crystal Alignment Agent Composition

According to the composition as shown in the following Table 1, a liquid crystal alignment agent composition was prepared in the same manner as in Example 1, except that the polymer P-4 for a liquid crystal alignment agent was used instead of the polymer P-1 for a liquid crystal alignment agent.

Examples 4 to 23: Preparation of Liquid Crystal Alignment Agent Compositions According to the composition as shown in the following Table 1, each liquid crystal alignment agent composition was prepared in the same manner as in Example 1, except that each of the polymers Q-2 to Q-21 for a liquid crystal alignment agent was used instead of the polymer Q-1 for a liquid crystal alignment agent.

Example 24: Preparation of Liquid Crystal Alignment Agent Composition

According to the composition as shown in the following Table 1, a liquid crystal alignment agent composition was prepared in the same manner as in Example 1, except that the polymer P-2 for a liquid crystal alignment agent prepared in Synthesis Example 2 was used instead of the polymer P-1 for a liquid crystal alignment agent, and the polymer Q-4 for a liquid crystal alignment agent was used instead of the polymer Q-1 for a liquid crystal alignment agent.

Examples 25 to 27: Preparation of Liquid Crystal Alignment Agent Compositions According to the composition as shown in the following Table 1, each liquid crystal alignment agent composition was prepared in the same manner as in Example 24, except that each of the polymers Q-10 to Q-12 for a liquid crystal alignment agent was used instead of the polymer Q-4 for a liquid crystal alignment agent.

Example 28: Preparation of Liquid Crystal Alignment Agent Composition

According to the composition as shown in the following Table 1, a liquid crystal alignment agent composition was prepared in the same manner as in Example 24, except that 4 g of the polymer P-2 for a liquid crystal alignment agent and 16 g of the polymer Q-4 for a liquid crystal alignment agent were added.

Examples 29 to 31: Preparation of Liquid Crystal Alignment Agent Compositions According to the composition as shown in the following Table 1, each liquid crystal alignment agent composition was prepared in the same manner as in Example 28, except that each of the polymers Q-10 to Q-12 for a liquid crystal alignment agent was used instead of the polymer Q-4 for a liquid crystal alignment agent.

Comparative Example 1: Preparation of Liquid Crystal Alignment Agent Composition A liquid crystal alignment agent composition was prepared in the same manner as in Example 1, except that 20 g of the polymer P-1 for a liquid crystal alignment agent was added without using the polymer Q-1 for a liquid crystal alignment agent.

Comparative Example 2: Preparation of Liquid Crystal Alignment Agent Composition A liquid crystal alignment agent composition was prepared in the same manner as in Example 1, except that 20 g of the polymer Q-1 for a liquid crystal alignment agent was added without using the polymer P-1 for a liquid crystal alignment agent.

Comparative Example 3: Preparation of Liquid Crystal Alignment Agent Composition According to the composition as shown in the following Table 1, a liquid crystal alignment agent composition was prepared in the same manner as in Example 1, except that the polymer PR-1 for a liquid crystal alignment agent was used instead of the polymer P-1 for a liquid crystal alignment agent.

Comparative Examples 4 to 6: Preparation of Liquid Crystal Alignment Agent Compositions According to the composition as shown in the following Table 1, each liquid crystal alignment agent composition was prepared in the same manner as in Example 1, except that each of the polymers QR-1 to QR-3 for a liquid crystal alignment agent was used instead of the polymer Q-1 for a liquid crystal alignment agent.

Comparative Example 7: Preparation of Liquid Crystal Alignment Agent Composition According to the composition as shown in the following Table 1, a liquid crystal alignment agent composition was prepared in the same manner as in Comparative Example 5, except that the polymer P-3 for a liquid crystal alignment agent was used instead of the polymer P-1 for a liquid crystal alignment agent.

Comparative Example 8: Preparation of Liquid Crystal Alignment Agent Composition According to the composition as shown in the following Table 1, a liquid crystal alignment agent composition was prepared in the same manner as in Comparative Example 6, except that the polymer P-4 for a liquid crystal alignment agent was used instead of the polymer P-1 for a liquid crystal alignment agent.

Comparative Examples 9 to 11: Preparation of Liquid Crystal Alignment Agent Compositions According to the composition as shown in the following Table 1, each liquid crystal alignment agent composition was prepared in the same manner as in Example 1, except that each of the polymers S-1 to S-3 for a liquid crystal alignment agent was used instead of the polymer Q-1 for a liquid crystal alignment agent.

The polymer compositions of the liquid crystal alignment agent compositions according to Examples 1 to 31 and Comparative Examples 1 to 11 are as shown in the following Table 1.

TABLE 1

| | First polymer | | Second polymer | | Mixing weight ratio of first and second polymers |
|---|---|---|---|---|---|
| | Type | Input (g) | Type | Input (g) | |
| Example 1 | P-1 | 10 | Q-1 | 10 | 50:50 |
| Example 2 | P-3 | 10 | Q-1 | 10 | 50:50 |
| Example 3 | P-4 | 10 | Q-1 | 10 | 50:50 |
| Example 4 | P-1 | 10 | Q-2 | 10 | 50:50 |
| Example 5 | P-1 | 10 | Q-3 | 10 | 50:50 |
| Example 6 | P-1 | 10 | Q-4 | 10 | 50:50 |
| Example 7 | P-1 | 10 | Q-5 | 10 | 50:50 |
| Example 8 | P-1 | 10 | Q-6 | 10 | 50:50 |
| Example 9 | P-1 | 10 | Q-7 | 10 | 50:50 |
| Example 10 | P-1 | 10 | Q-8 | 10 | 50:50 |
| Example 11 | P-1 | 10 | Q-9 | 10 | 50:50 |
| Example 12 | P-1 | 10 | Q-10 | 10 | 50:50 |
| Example 13 | P-1 | 10 | Q-11 | 10 | 50:50 |
| Example 14 | P-1 | 10 | Q-12 | 10 | 50:50 |
| Example 15 | P-1 | 10 | Q-13 | 10 | 50:50 |
| Example 16 | P-1 | 10 | Q-14 | 10 | 50:50 |
| Example 17 | P-1 | 10 | Q-15 | 10 | 50:50 |
| Example 18 | P-1 | 10 | Q-16 | 10 | 50:50 |
| Example 19 | P-1 | 10 | Q-17 | 10 | 50:50 |
| Example 20 | P-1 | 10 | Q-18 | 10 | 50:50 |
| Example 21 | P-1 | 10 | Q-19 | 10 | 50:50 |
| Example 22 | P-1 | 10 | Q-20 | 10 | 50:50 |
| Example 23 | P-1 | 10 | Q-21 | 10 | 50:50 |
| Example 24 | P-2 | 10 | Q-4 | 10 | 50:50 |
| Example 25 | P-2 | 10 | Q-10 | 10 | 50:50 |
| Example 26 | P-2 | 10 | Q-11 | 10 | 50:50 |
| Example 27 | P-2 | 10 | Q-12 | 10 | 50:50 |
| Example 28 | P-2 | 4 | Q-4 | 16 | 20:80 |
| Example 29 | P-2 | 4 | Q-10 | 16 | 20:80 |
| Example 30 | P-2 | 4 | Q-11 | 16 | 20:80 |
| Example 31 | P-2 | 4 | Q-12 | 16 | 20:80 |
| Comparative Example 1 | P-1 | 20 | — | — | 100:0 |
| Comparative Example 2 | — | — | Q-1 | 20 | 0:100 |
| Comparative Example 3 | PR-1 | 10 | Q-1 | 10 | 50:50 |
| Comparative Example 4 | P-1 | 10 | QR-1 | 10 | 50:50 |
| Comparative Example 5 | P-1 | 10 | QR-2 | 10 | 50:50 |
| Comparative Example 6 | P-1 | 10 | QR-3 | 10 | 50:50 |
| Comparative Example 7 | P-3 | 10 | QR-2 | 10 | 50:50 |
| Comparative Example 8 | P-4 | 10 | QR-3 | 10 | 50:50 |
| Comparative Example 9 | P-1 | 10 | S-1 | 10 | 50:50 |
| Comparative Example 10 | P-1 | 10 | S-2 | 10 | 50:50 |
| Comparative Example 11 | P-1 | 10 | S-3 | 10 | 50:50 |

Experimental Example

1) Preparation of Liquid Crystal Alignment Cell

Each of the liquid crystal alignment agent compositions prepared in the examples and comparative examples was used to prepare a liquid crystal alignment cell.

Specifically, the liquid crystal alignment agent composition was coated onto the upper and lower substrates for a voltage holding ratio (VHR), in which ITO electrodes with a thickness of 60 nm and an area of 1 cm×1 cm were patterned on a square glass substrate with a size of 2.5 cm×2.7 cm, by a spin coating method, respectively. Then, the substrates coated with the liquid crystal alignment agent were placed on a hot plate at about 70° C. and dried for 3 minutes to evaporate the solvent. For alignment treatment of the coated substrates thus obtained, each of upper and lower coated substrates was irradiated with UV at 254 nm under an exposure dose of 0.1 to 1.0 J/cm$^2$ using an exposure equipped with a line polarizer. Thereafter, the alignment-treated upper and lower substrates were baked (cured) in an oven at about 230° C. for about 30 minutes to obtain a coating film with a thickness of 0.1 μm. Thereafter, a sealing agent impregnated with ball spacers with a size of 4.5 μm was coated onto the edges of the upper substrate excluding a liquid crystal inlet. The alignment films formed on the upper and lower substrates were then aligned such that they faced each other and the alignment directions were aligned with each other, and the upper and lower substrates were bonded together and the sealing agent was cured with UV and heat to prepare an empty cell. Then, a liquid crystal was injected into the empty cells, and the inlet was sealed with a sealing agent to prepare a liquid crystal cell.

2) Evaluation of Liquid Crystal Alignment Property

Polarizing plates were attached to the upper and lower substrate plates of the above-prepared liquid crystal cell so as to be perpendicular to each other. At this time, the polarizing axis of the polarizing plate attached to the lower substrate plate was allowed to be parallel to the alignment axis of the liquid crystal cell. The polarizing plate-attached liquid crystal cell was placed on a backlight having luminance of 7000 cd/cm², and light leakage was observed with the naked eye. When the liquid crystal alignment film had an excellent alignment property to align liquid crystals properly, light did not pass through the upper and lower polarizing plates which were attached perpendicular to each other, and the liquid crystal cell was observed dark without defects. In this case, the alignment property was recorded as 'good'. When light leakage such as a liquid crystal flow mark or a bright spot was observed, it was recorded as 'poor' in Table 2 below.

3) Evaluation of Liquid Crystal Alignment Stability

Polarizing plates were attached to the upper and lower substrate plates of the above-prepared liquid crystal alignment cell so as to be perpendicular to each other. The polarizing plate-attached liquid crystal alignment cell was attached on a backlight having luminance of 7000 cd/cm², and the luminance in a black state was measured using a luminance measuring instrument PR-880. Then, the liquid crystal cell was operated at room temperature with an alternating voltage of 5 V for 24 hours. Thereafter, in the voltage-off state of the liquid crystal cell, luminance in the black state was measured as described above. A difference between the initial luminance ($L_0$) measured before operation of the liquid crystal cell and the later luminance ($L_1$) measured after operation was divided by the initial luminance ($L_0$), and then multiplied by 100 to calculate a luminance fluctuation rate. As the calculated luminance fluctuation rate is close to 0%, it means that the alignment stability is excellent. Through the measurement results of the luminance fluctuation rate, the afterimage level was evaluated under the following criteria. It is preferable that the AC afterimage is minimized. In the measurement results, when the luminance fluctuation rate was less than 10%, it was evaluated as 'excellent', when the luminance fluctuation rate was between 10% to 20%, it was evaluated as 'ordinary', and when the luminance fluctuation rate was more than 20%, it was evaluated as 'poor'. The results are shown in Table 2 below.

4) Measurement of Voltage Holding Ratio (VHR)

Liquid crystal cells for voltage holding ratio were prepared using the liquid crystal alignment agents prepared in Examples 1 to 31 and Comparative Examples 1 to 11 by the following method, respectively.

The liquid crystal alignment agent was coated onto the upper and lower substrates for a voltage holding ratio (VHR), in which ITO electrodes with a thickness of 60 nm and an area of 1 cm×1 cm were patterned on a square glass substrate with a size of 2.5 cm×2.7 cm, by a spin coating method, respectively.

Then, the substrates coated with the liquid crystal alignment agent were placed on a hot plate at about 70° C. and dried for 3 minutes to evaporate the solvent. For alignment treatment of the coated substrates thus obtained, each of upper and lower coated substrates was irradiated with UV at 254 nm under an exposure dose of 1 J/cm² using an exposure equipped with a line polarizer. Thereafter, the alignment-treated upper and lower substrates were baked and cured in an oven at about 230° C. for 30 minutes to obtain a coating film with a thickness of 0.1 µm. Thereafter, a sealing agent impregnated with ball spacers with a size of 4.5 µm was coated onto the edges of the upper/lower substrate excluding a liquid crystal inlet. The alignment films formed on the upper and lower substrates were then aligned such that they faced each other and the alignment directions were aligned with each other, and the upper and lower substrates were bonded together and the sealing agent was cured with UV and heat to prepare an empty cell. Then, a liquid crystal was injected into the empty cells, and the inlet was sealed with a sealing agent to prepare a liquid crystal cell.

The voltage holding ratio (VHR) which is an electrical property of the liquid crystal cell prepared by the above method was measured using TOYO 6254 equipment. The voltage holding ratio was measured under harsh conditions of 1 V, 1 Hz, and 60° C. The voltage holding ratio of 100% is an ideal value. When the measurement result is 70% or more, it is evaluated as 'good', and when the measurement result is less than 70%, it is evaluated as 'poor', and the results are shown in Table 2 below.

TABLE 2

| | Evaluation of liquid crystal alignment property | Evaluation of liquid crystal alignment stability | Evaluation of voltage holding ratio |
|---|---|---|---|
| Example 1 | Good | Excellent | Good |
| Example 2 | Good | Excellent | Good |
| Example 3 | Good | Excellent | Good |
| Example 4 | Good | Excellent | Good |
| Example 5 | Good | Excellent | Good |
| Example 6 | Good | Excellent | Good |
| Example 7 | Good | Excellent | Good |
| Example 8 | Good | Excellent | Good |
| Example 9 | Good | Excellent | Good |
| Example 10 | Good | Excellent | Good |
| Example 11 | Good | Excellent | Good |
| Example 12 | Good | Excellent | Good |
| Example 13 | Good | Excellent | Good |
| Example 14 | Good | Excellent | Good |
| Example 15 | Good | Excellent | Good |
| Example 16 | Good | Excellent | Good |
| Example 17 | Good | Excellent | Good |
| Example 18 | Good | Excellent | Good |
| Example 19 | Good | Excellent | Good |
| Example 20 | Good | Excellent | Good |
| Example 21 | Good | Excellent | Good |
| Example 22 | Good | Excellent | Good |
| Example 23 | Good | Excellent | Good |
| Example 24 | Good | Excellent | Good |
| Example 25 | Good | Excellent | Good |
| Example 26 | Good | Excellent | Good |
| Example 27 | Good | Excellent | Good |
| Example 28 | Good | Excellent | Good |
| Example 29 | Good | Excellent | Good |
| Example 30 | Good | Excellent | Good |
| Example 31 | Good | Excellent | Good |
| Comparative Example 1 | Good | Ordinary | Poor |
| Comparative Example 2 | Poor | Poor | Good |
| Comparative Example 3 | Poor | Poor | Poor |
| Comparative Example 4 | Good | Good | Poor |
| Comparative Example 5 | Good | Good | Poor |
| Comparative Example 6 | Good | Good | Poor |
| Comparative Example 7 | Good | Good | Poor |
| Comparative Example 8 | Good | Good | Poor |
| Comparative Example 9 | Poor | Poor | Good |
| Comparative Example 10 | Good | Ordinary | Good |
| Comparative Example 11 | Poor | Poor | Poor |

* Light exposure dose during production of liquid crystal alignment cell: 0.1 to 1.0 J/cm²

As shown in Table 2, it was confirmed that since each of the liquid crystal alignment agent compositions of Examples 1 to 31 includes the polymer for the first liquid crystal alignment agent which is a partially imidized polyimide precursor along with the polymer for the second liquid crystal alignment agent which is a polyimide precursor derived from a diamine having an asymmetric pyridine structure, an excellent alignment property may be obtained without an initial thermosetting process, the AC afterimage-related luminance fluctuation rate was excellent at less than 10%, and the voltage holding ratio was also excellent at 70% or more under a high temperature environment, thereby exhibiting excellent effects in terms of electrical properties.

In contrast, the liquid crystal alignment agent compositions of Comparative Examples 1 to 11 include neither of the polymer for the first liquid crystal alignment agent which is a partially imidized polyimide precursor or the polymer for the second liquid crystal alignment agent which is a polyimide precursor derived from a diamine having an asymmetric pyridine structure or include only the polymer composed of the single component of the diamines, and as a result, electrical properties or alignment properties of the liquid crystal cells were remarkably deteriorated.

Particularly, in the case of Comparative Example 1, only the polymer for the first liquid crystal alignment agent which is a partially imidized polyimide precursor was used, and as a result, there was no problem in the alignment property of the liquid crystal alignment film, but the AC afterimage-related luminance fluctuation rate was 10% or more, and thus deterioration in the liquid crystal alignment stability was observed. In addition, the voltage holding ratio was less than 70%, which was evaluated as 'poor'. In the case of Comparative Example 2, only the polymer for the second liquid crystal alignment agent which is a polyimide precursor derived from a diamine having an asymmetric pyridine structure was used. As a result, the voltage holding ratio was observed at the equivalent level or more, but there were problems in that light leakage such as a liquid crystal flow mark or a bright spot was observed in the evaluation of the alignment property of the liquid crystal alignment film, and thus it was evaluated as 'poor', and the luminance fluctuation rate of more than 20% was observed in the AC afterimage evaluation, and thus it was evaluated as 'poor'. In the case of Comparative Example 3, the polymer for the second liquid crystal alignment agent which is a polyimide precursor derived from a diamine having an asymmetric pyridine structure was used, but para-phenylenediamine (p-PDA) was used instead of the partially imidized polyimide precursor as the first liquid crystal polymer, and as a result, all of the liquid crystal alignment property, stability, and voltage holding ratio were evaluated as 'poor'.

Furthermore, in the case of Comparative Examples 4 to 11, the polymer for the first liquid crystal alignment agent which is the partially imidized polyimide precursor was used, but the polymer prepared using para-phenylenediamine (p-PDA), oxydianiline (ODA), or methylenedianiline (MDA) was used instead of the diamine having the specific asymmetric structure which is the polymer for the second liquid crystal alignment agent, and as a result, there was no problem in the liquid crystal alignment property, but their voltage holding ratio was less than 70%, and thus they were evaluated as 'poor', indicating that there is a problem in terms of electrical properties.

The invention claimed is:

1. A liquid crystal alignment film comprising a liquid crystal alignment agent composition comprising a first polymer for a first liquid crystal alignment agent including a repeating unit represented by Chemical Formula 1 and one or more repeating units selected from the group of a repeating unit represented by Chemical Formula 2 and a repeating unit represented by Chemical Formula 3, wherein the repeating unit represented by Chemical Formula 1 is included in an amount of 5 mol % to 74 mol % with respect to a total of the repeating units represented by the following Chemical Formulae 1 to 3; and a second polymer for a second liquid crystal alignment agent including one or more repeating units selected from the group of a repeating unit represented by Chemical Formula 4, a repeating unit represented by Chemical Formula 5, and a repeating unit represented by Chemical Formula 6:

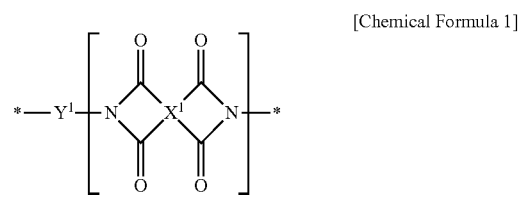

[Chemical Formula 1]

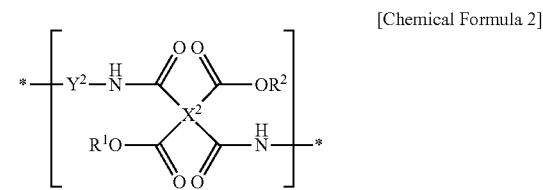

[Chemical Formula 2]

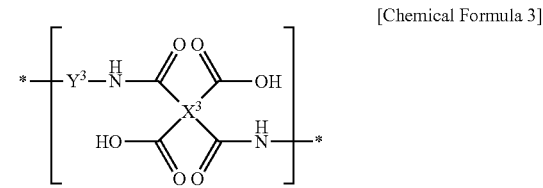

[Chemical Formula 3]

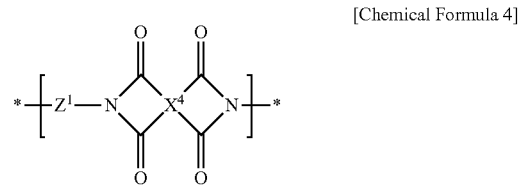

[Chemical Formula 4]

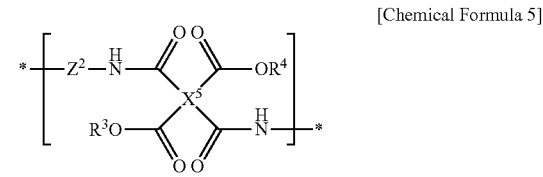

[Chemical Formula 5]

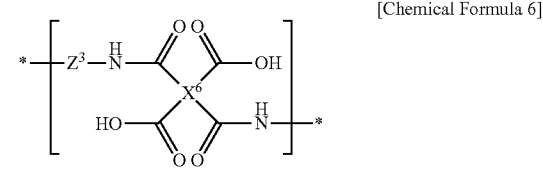

[Chemical Formula 6]

wherein, in the Chemical Formulae 1 to 6, $R^1$, $R^2$, $R^3$, and $R^4$ are each independently hydrogen or a $C_{1-10}$ alkyl, provided that $R^1$ and $R^2$ are not both hydrogen, and that $R^3$ and $R^4$ are not both hydrogen, $X^1$ is a tetravalent organic group represented by Chemical Formula 7:

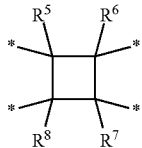

[Chemical Formula 7]

wherein, in the Chemical Formula 7, $R^5$, $R^6$, $R^7$, and $R^8$ are each independently hydrogen or a $C_{1-6}$ alkyl, $X^2$, $X^3$, $X^4$, $X^5$, and $X^6$ are each independently a tetravalent organic group derived from a hydrocarbon having 4 to 20 carbon atoms, or a tetravalent organic group derived from a hydrocarbon having 4 to 20 carbon atoms wherein one or more of H is substituted with a halogen, or one or more of —CH$_2$— is substituted with —O—, —CO—, —S—, —SO—, —SO$_2$—, or —CONH— to prevent direct binding with oxygen or sulfur atoms in the tetravalent organic group, in the Chemical Formulae 1 to 3, $Y^1$ to $Y^3$ are each independently a divalent organic group represented by Chemical Formula 8:

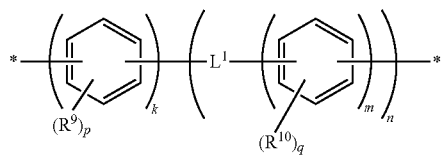

[Chemical Formula 8]

wherein, in the Chemical Formula 8, $R^9$ and $R^{10}$ are each independently a halogen, a cyano, a $C_{1-10}$ alkyl, a $C_{2-10}$ alkenyl, a $C_{1-10}$ alkoxy, a $C_{1-10}$ fluoroalkyl, or a $C_{1-10}$ fluoroalkoxy, p and q are each independently an integer of 0 to 4, $L^1$ is a single bond, —O—, —CO—, —S—, —SO$_2$—, —C(CH$_3$)$_2$—, —C(CF$_3$)$_2$—, —CONH—, —COO—, —(CH$_2$)$_z$—, —O(CH$_2$)$_z$O—, —O—(CH$_2$)$_z$—, —OCH$_2$—C(CH$_3$)$_2$—CH$_2$O—, —COO—(CH$_2$)$_z$—OCO—, or —OCO—(CH$_2$)$_z$—COO—, wherein z is an integer of 1 to 10, k and m are each independently an integer of 1 to 3, n is an integer of 0 to 3, in Chemical the Formulae 4 to 6, $Z^1$, $Z^2$, and $Z^3$ are each independently a divalent organic group represented by Chemical Formula 9:

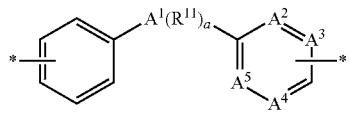

[Chemical Formula 9]

wherein, in the Chemical Formula 9, $A^1$ is an element of nitrogen, phosphorus, arsenic, tin or bismuth, $R^{11}$ is hydrogen or a $C_{1-10}$ alkyl, a is an integer of 1 to 3, and $A^2$, $A^3$, $A^4$, and $A^5$ are nitrogen or carbon, provided that at least one of $A^2$ or $A^5$ is nitrogen and the other is carbon and $A^3$ and $A^4$ are carbon, wherein X2, X3, X4, X5, and X6 are each independently a tetravalent organic group represented by Chemical Formula 10:

[Chemical Formula 10]

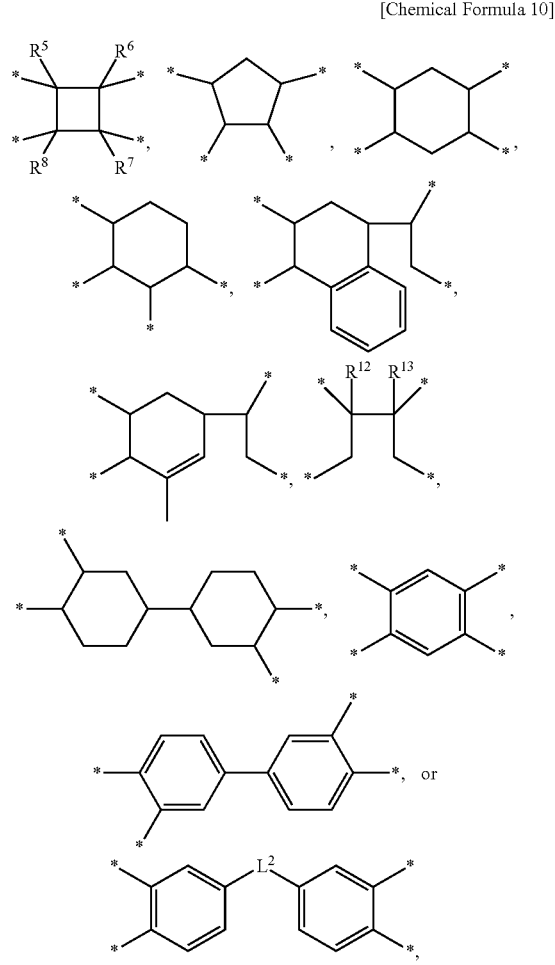

wherein, in Chemical Formula 10, $R^5$, $R^6$, $R^7$, and $R^8$ are each independently hydrogen or a $C_{1-6}$ alkyl, $R^{12}$ and $R^{13}$ are each independently hydrogen or a $C_{1-10}$ alkyl, and $L^2$ is any one selected from the group consisting of a single bond, —O—, —CO—, —S—, —SO—, —SO$_2$—, —CR$^{14}$R$^{15}$—, —CONH—, —COO—, —(CH$_2$)$_b$—, —O—(CH$_2$)$_b$O—, —COO—(CH$_2$)$_b$—OCO—, —HN—(CH$_2$)$_b$—NH—, —R$^{14}$N—(CH$_2$)$_b$—NR$^{15}$—, phenylene, and combinations thereof, wherein $R^{14}$ and $R^{15}$ are each independently hydrogen, a $C_{1-10}$ alkyl, or a $C_{1-10}$ fluoroalkyl, and each b is independently an integer of 1 to 10, wherein, $Y^1$ of the repeating unit represented by Chemical Formula 1 is connected to an adjacent repeating unit represented by Chemical Formula 1 as N—$Y^1$—N—, or to an adjacent repeating unit represented by Chemical Formula 2 or 3 as —HN—$Y^1$—N—; $Y^2$ of the repeating unit represented by Chemical Formula 2 is connected to an adjacent repeating unit represented by Chemical Formula 2 or 3 as —HN—$Y^2$—NH—, or to an adjacent repeating unit represented by Chemical Formula 1 as —N—$Y^2$—NH—; and $Y^3$ of the repeating unit represented by Chemical Formula 3 is connected to an adjacent repeating unit represented by Chemical Formula 2 or 3 as —NH—$Y^3$—NH— or to an adjacent repeating unit represented by Chemical Formula 1 as —N—$Y^3$—NH—, wherein, $Z^1$ of the repeating unit represented by Chemical Formula 4 is connected to an adjacent repeating unit represented by Chemical Formula 4 as —N—$Z^1$—N—, or to an adjacent repeating unit represented by Chemical Formula 5 or 6 as —HN—$Z^1$—N—; $Z^2$ of the repeating unit represented by Chemical Formula 5 is connected to an adjacent repeating unit represented by Chemical Formula 5 or 6 as —HN—$Z^2$—NH—, or to an adjacent repeating unit represented by Chemical Formula 4 as —N—$Z^2$—NH—; and $Z^3$ of the repeating unit represented by Chemical Formula 6 is connected to an adjacent repeating unit represented by Chemical Formula 5 or 6 as —NH—$Z^3$—NH— or to an adjacent repeating unit represented by Chemical Formula 4 as —N—$Z^3$—NH—, and wherein the liquid crystal alignment film is prepared by an alignment treatment including irradiating with polarized light or rubbing in one direction, without preceding or concurrent curing, prior to a curing heat treatment.

2. The liquid crystal alignment agent film of claim 1, wherein the Chemical Formula 8 is a divalent organic group represented by Chemical Formula 11 or Chemical Formula 12:

[Chemical Formula 11]

[Chemical Formula 12]

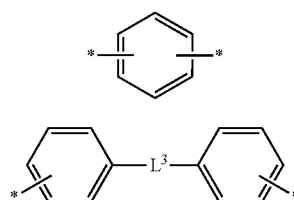

wherein, in Chemical Formula 12, $L^3$ is a single bond, —O—, —SO$_2$—, or —CR$^{16}$R$^{17}$—, wherein R$^{16}$ and R$^{17}$ are each independently hydrogen or a C$_{1-10}$ alkyl.

3. The liquid crystal alignment agent film of claim 1, wherein in the Chemical Formula 9, A$^1$ is nitrogen, R$^{11}$ is hydrogen, and a is 1.

4. The liquid crystal alignment agent film of claim 1, wherein the Chemical Formula 9 includes one or more repeating units selected from the group of Chemical Formula 9-1, Chemical Formula 9-2, and Chemical Formula 9-3:

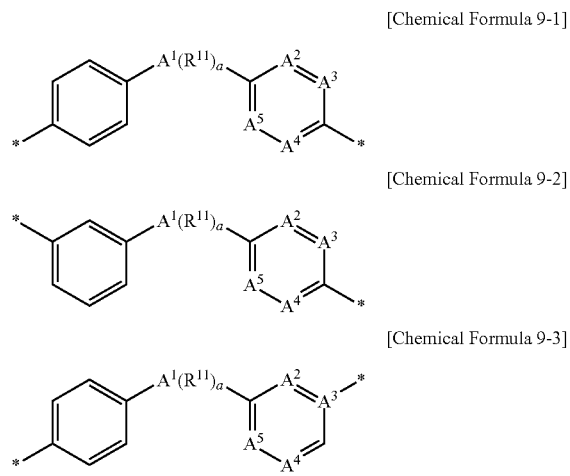

[Chemical Formula 9-1]

[Chemical Formula 9-2]

[Chemical Formula 9-3]

wherein, in the Chemical Formulae 9-1 to 9-3,

A$^1$ to A$^5$, R$^{11}$, and a are as defined in claim 1.

5. The liquid crystal alignment agent film of claim 1, wherein the first polymer for the first liquid crystal alignment agent and the second polymer for the second liquid crystal alignment agent are included at a weight ratio of 5:95 to 95:5.

6. The liquid crystal alignment agent film of claim 1, wherein the second polymer for the second liquid crystal alignment agent further includes one or more repeating units selected from the group of a repeating unit represented by Chemical Formula 13, a repeating unit represented by Chemical Formula 14, and a repeating unit represented by Chemical Formula 15:

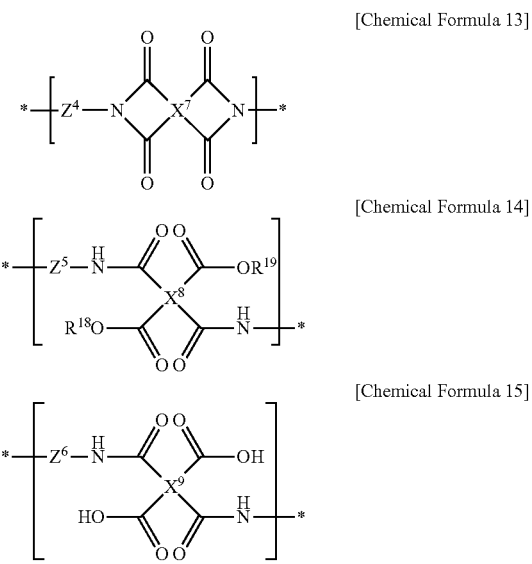

[Chemical Formula 13]

[Chemical Formula 14]

[Chemical Formula 15]

wherein, in the Chemical Formulae 13 to 15, at least one of R$^{18}$ and R$^{19}$ is an alkyl group having 1 to 10 carbon atoms and the other is hydrogen, X$^7$ to X$^9$ are each independently a tetravalent organic group, and $Z^4$ to $Z^6$ are each independently a divalent organic group represented by Chemical Formula 16:

[Chemical Formula 16]

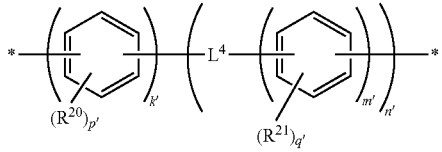

wherein, in the Chemical Formula 16,
$R^{20}$ and $R^{21}$ are each independently a halogen, a cyano, a $C_{1-10}$ alkyl, a $C_{2-10}$ alkenyl, a $C_{1-10}$ alkoxy, a $C_{1-10}$ fluoroalkyl, or a $C_{1-10}$ fluoroalkoxy,
p' and q' are each independently an integer of 0 to 4,
$L^4$ is a single bond, —O—, —CO—, —S—, —SO$_2$—, —C(CH$_3$)$_2$—, —C(CF$_3$)$_2$—, —CONH—, —COO—, —(CH$_2$)$_z$—, —O—(CH$_2$)$_z$O—, —O—(CH$_2$)$_z$—, —OCH$_2$—C(CH$_3$)$_2$—CH$_2$O—, —COO—(CH$_2$)$_z$—OCO—, or —OCO—(CH$_2$)$_z$—COO—, wherein each z is independently an integer of 1 to 10,
k' and m' are each independently an integer of 0 to 3,
n' is an integer of 0 to 3, and
when n'=0, k' is 1 to 3, and when k'=0, m and n are each independently 1 to 3.

7. The liquid crystal alignment agent film of claim 6, wherein the Chemical Formula 16 is Chemical Formula 17 or Chemical Formula 18:

[Chemical Formula 17]

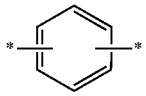

[Chemical Formula 18]

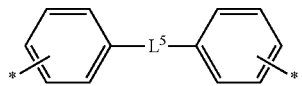

wherein, in the Chemical Formula 18,
$L^5$ is a single bond, —O—, —SO$_2$—, or —CR$^{22}$R$^{23}$—, wherein $R^{22}$ and $R^{23}$ are each independently hydrogen or a $C_{1-10}$ alkyl.

8. A method of producing the liquid crystal alignment film of claim 1, the method comprising the steps of:
coating a solution or a dispersion, of the liquid crystal alignment agent composition comprising the first polymer for a first liquid crystal alignment agent and the second polymer for a second liquid crystal alignment agent onto a substrate to form a coating film;
drying the coating film;
irradiating the coating film with light immediately after the step of drying the coating film to perform an alignment treatment; and
heat-treating and curing the alignment-treated coating film.

9. The method of producing the liquid crystal alignment film of claim 8, wherein the liquid crystal alignment agent composition is dissolved or dispersed in an organic solvent.

10. The method of producing the liquid crystal alignment film of claim 8, wherein the step of drying the coating film is performed at 50° C. to 150° C.

11. The method of producing the liquid crystal alignment film of claim 8, wherein in the alignment treatment step, the light irradiation is performed by irradiating polarized ultraviolet rays having a wavelength of 150 nm to 450 nm.

12. The method of producing the liquid crystal alignment film of claim 8, wherein in the step of heat-treating and curing the coating film, the heat treatment temperature is 150° C. to 300° C.

13. A liquid crystal display device comprising the liquid crystal alignment film of claim 1.

\* \* \* \* \*